(12) United States Patent
Elias

(10) Patent No.: US 9,327,185 B2
(45) Date of Patent: May 3, 2016

(54) SYSTEMS, METHODS, AND APPARATUS FOR BINGO GAMES HAVING A VISIBLE BALL QUEUE

(71) Applicant: Gamesys Ltd., London (GB)

(72) Inventor: Hans Elias, St. Albans (GB)

(73) Assignee: Gamesys Ltd., London (GB)

( * ) Notice: Subject to any disclaimer, the term of this patent is extended or adjusted under 35 U.S.C. 154(b) by 0 days.

(21) Appl. No.: 14/215,132

(22) Filed: Mar. 17, 2014

(65) Prior Publication Data

US 2014/0274278 A1 Sep. 18, 2014

Related U.S. Application Data

(60) Provisional application No. 61/801,407, filed on Mar. 15, 2013.

(51) Int. Cl.
| | |
|---|---|
| *A63F 3/06* | (2006.01) |
| *A63F 13/822* | (2014.01) |
| *A63F 13/30* | (2014.01) |
| *G07F 17/32* | (2006.01) |

(52) U.S. Cl.
CPC .............. *A63F 3/0645* (2013.01); *A63F 13/30* (2014.09); *A63F 13/822* (2014.09); *G07F 17/326* (2013.01); *G07F 17/3211* (2013.01); *A63F 2300/8064* (2013.01); *G07F 17/329* (2013.01)

(58) Field of Classification Search
CPC .................................................... A63F 3/0645
USPC ......................................................... 463/19
See application file for complete search history.

(56) References Cited

U.S. PATENT DOCUMENTS

| | | | | |
|---|---|---|---|---|
| 5,265,877 | A  * | 11/1993 | Boylan et al. ................. | 273/139 |
| 5,651,735 | A  * | 7/1997 | Baba .............................. | 463/18 |
| 5,935,002 | A | 8/1999 | Falciglia | |
| 6,120,024 | A | 9/2000 | Lind | |
| 6,581,935 | B1 * | 6/2003 | Odom ........................... | 273/269 |
| 6,755,738 | B2 * | 6/2004 | Glasson et al. ................ | 463/19 |
| 6,755,742 | B1 | 6/2004 | Hartman et al. | |
| 7,537,520 | B2 | 5/2009 | Campo et al. | |
| 7,695,362 | B1 * | 4/2010 | Kisenwether .................. | 463/19 |
| 7,749,065 | B1 * | 7/2010 | Englman ........................ | 463/17 |
| 7,806,762 | B2 | 10/2010 | Padgett | |
| 7,874,907 | B2 * | 1/2011 | Lozano et al. ................. | 463/19 |

(Continued)

FOREIGN PATENT DOCUMENTS

GB 2405805 3/2005

OTHER PUBLICATIONS

"Bingo" written by Robert Suh, published on or before Oct. 27, 2011, printed from URL <http://web.archive.org/web/20111027012227/http://robertsuh.com/fundraising-bingo.html>, 4 pages.*

(Continued)

*Primary Examiner* — Jason Skaarup
(74) *Attorney, Agent, or Firm* — Michael D. Downs; Fincham Downs, LLC

(57) ABSTRACT

Systems, apparatus, methods, and articles of manufacture provide for a bingo game including a representation of a ball queue. In one example, a display for a bingo game represents a queue of one or more upcoming ball calls for the bingo game. In some embodiments, a ball queue may include partial information about an upcoming ball call (e.g., an indication of a corresponding bingo card column but not a bingo number).

20 Claims, 16 Drawing Sheets

(56) References Cited

U.S. PATENT DOCUMENTS

| | | | |
|---|---|---|---|
| 8,038,534 B1 | 10/2011 | Luciano et al. | |
| 8,062,117 B2 | 11/2011 | Hsu | |
| 8,070,161 B2 | 12/2011 | Ward | |
| 8,123,607 B2 | 2/2012 | Van Asdale | |
| 8,133,107 B2 | 3/2012 | Bailey et al. | |
| 8,235,787 B2 | 8/2012 | Lind | |
| 8,845,412 B2* | 9/2014 | Olsen | 463/19 |
| 2002/0137562 A1* | 9/2002 | Malone | 463/19 |
| 2003/0160389 A1* | 8/2003 | Loewenstein | 273/296 |
| 2004/0009806 A1* | 1/2004 | Odom | 463/19 |
| 2004/0063491 A1 | 4/2004 | Banyai et al. | |
| 2004/0259622 A1 | 12/2004 | Duhamel | |
| 2005/0054427 A1* | 3/2005 | Toyoda | 463/20 |
| 2005/0250572 A1* | 11/2005 | Kane et al. | 463/17 |
| 2006/0160603 A1* | 7/2006 | Lulek | 463/19 |
| 2007/0117604 A1* | 5/2007 | Hill | 463/16 |
| 2007/0232384 A1* | 10/2007 | Pace | 463/25 |
| 2008/0125208 A1 | 5/2008 | Waters | |
| 2009/0029759 A1 | 1/2009 | Brandt | |
| 2009/0075714 A1 | 3/2009 | Meyer et al. | |
| 2009/0312082 A1 | 12/2009 | Hsu | |
| 2009/0318231 A1 | 12/2009 | Lange | |
| 2010/0062829 A1 | 3/2010 | Chan | |
| 2011/0195771 A1 | 8/2011 | Shaw | |
| 2011/0287823 A1 | 11/2011 | Guinn et al. | |
| 2012/0122539 A1 | 5/2012 | Khal et al. | |
| 2012/0172117 A1 | 7/2012 | Doorgeest | |
| 2012/0184367 A1* | 7/2012 | Parrott et al. | 463/31 |
| 2013/0310134 A1* | 11/2013 | Daeges et al. | 463/20 |
| 2013/0324210 A1* | 12/2013 | Doig et al. | 463/19 |
| 2014/0248935 A1* | 9/2014 | Williams et al. | 463/19 |

OTHER PUBLICATIONS

"Bingo—Lucky-balls.com" published to YouTube on or before Feb. 6, 2012, accessed and printed from URL <https://www.youtube.com/watch?v=ZCVc4A5nfwM>, 2 pages.*

Website: "Bonus Bingo" (http://www.vegasexperts.com/wagerinfo/articles/bdog-bingo.asp) Download Date:Oct. 2, 2012; 2 pp.

Website: "30-Ball Casino Bingo" (http://www.gamesandcasino.com/casino-table-games/30-ball-casino-bingo.htm) Download Date:Oct. 2, 2012; 1 pp.

* cited by examiner

SYSTEMS, METHODS, AND APPARATUS FOR BINGO GAMES HAVING A VISIBLE BALL QUEUE

CROSS-REFERENCE TO RELATED APPLICATIONS

The present application claims the benefit of priority of U.S. Provisional Patent Application No. 61/801,407 filed Mar. 15, 2013, entitled "SYSTEMS, METHODS, AND APPARATUS FOR BINGO GAMES HAVING A VISIBLE BALL QUEUE," which is incorporated by reference in the present application.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BRIEF DESCRIPTION OF THE DRAWINGS

An understanding of embodiments described in this disclosure and many of the related advantages may be readily obtained by reference to the following detailed description when considered with the accompanying drawings, of which.

DETAILED DESCRIPTION

A. Introduction

Figure 1:
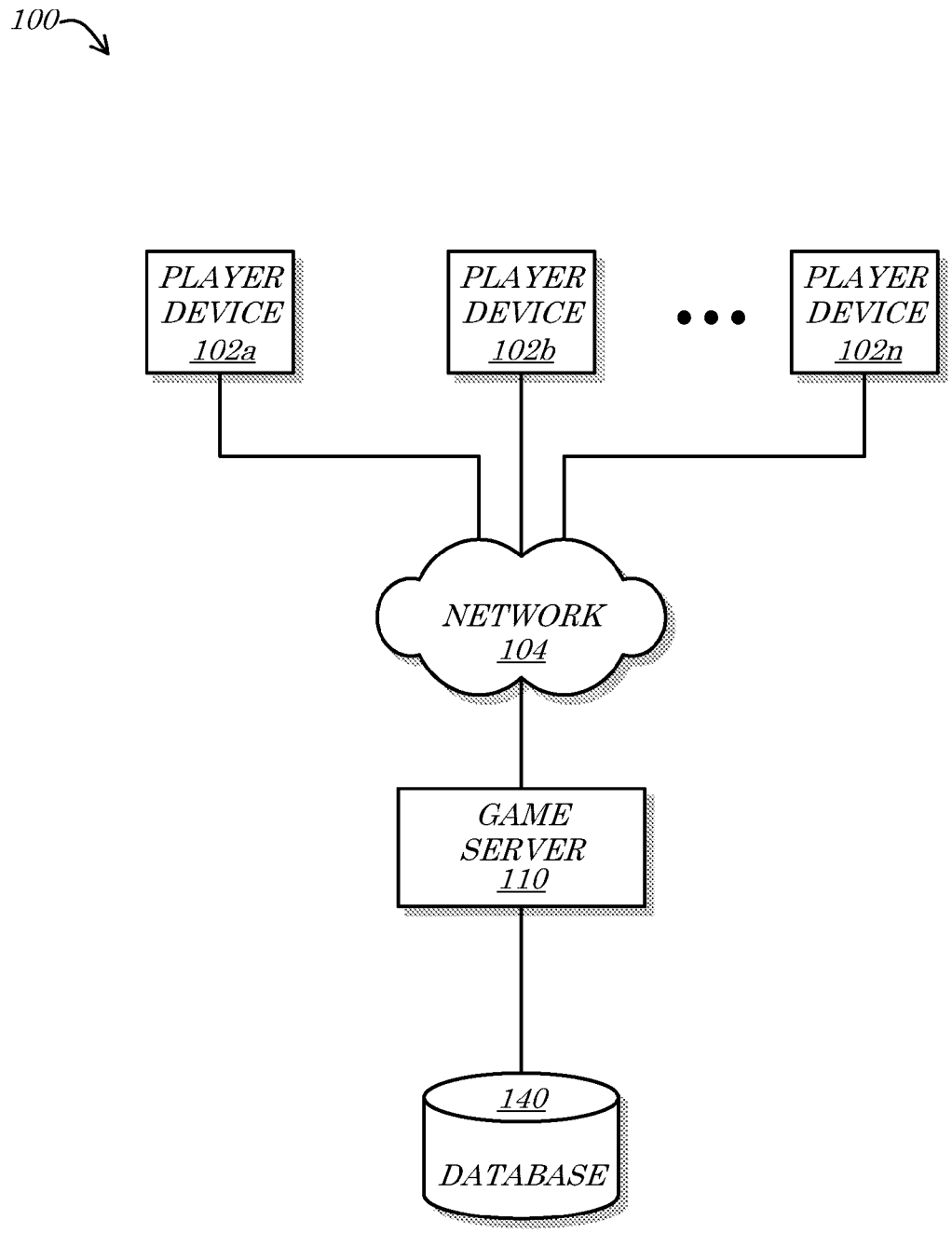
FIG. 1 is a block diagram of a system according to one or more embodiments.

Inventors have recognized that, in accordance with some embodiments described in this disclosure, some types of game providers and some types of social network users, players and other types of users, may find it beneficial to provide and/or to participate in a bingo game that provides information about one or more bingo game symbols in a determined sequence of bingo game symbols.

In accordance with some embodiments of the present invention, one or more systems, apparatus, methods, articles of manufacture, and/or computer readable media (e.g., a non-transitory computer readable memory storing instructions for directing a processor) provide for one or more of: (i) determining a queue of bingo symbols for a bingo game; (ii) generating a representation of at least one bingo symbol of a queue of bingo symbols (e.g., a displayed queue of bingo balls or "visible ball queue"); (iii) enabling at least one bingo symbol for play in the bingo game (e.g., enabling a bingo ball for play when the bingo ball is represented in a queue of bingo balls not yet enabled for play); (iv) determining a sequence of at least two bingo symbols for a bingo game (e.g., drawing a sequence of bingo numbers); and/or (v) advancing a bingo symbol displayed in a queue of symbols not yet enabled for play (e.g., within the queue, out of the queue).

In accordance with some embodiments of the present invention, one or more systems, apparatus, methods, articles of manufacture, and/or computer readable media provide for one or more of: (i) determining an identifier that identifies a bingo symbol (e.g., a bingo number); (ii) determining a category identifier that identifies a category associated with a bingo symbol (e.g., a bingo card column identifier or other location identifier); (iii) providing to a player an indication of the category identifier associated with the bingo symbol before providing to the player an indication of the identifier that identifies the bingo symbol (e.g., displaying a "B" bingo ball without a number); and/or (iv) after providing to a player an indication of the category identifier, providing to the player an indication of the identifier that identifies the bingo symbol (e.g., revealing a bingo number for a displayed bingo ball).

In accordance with some embodiments of the present invention, one or more systems, apparatus, methods, articles of manufacture, and/or computer readable media provide for one or more of: (i) determining an order a bingo symbol will be called in a bingo game; (ii) after determining the order and before calling or otherwise enabling the bingo symbol for play, providing to a player partial information about the bingo symbol (e.g., indicating a location identifier and/or order of a bingo number but not the bingo number); (iii) providing to the player an indication of the order the bingo symbol will be called for play (e.g., displaying a representation of a drawn bingo ball in a queue of bingo balls to be enabled for play); and/or (iv) calling or otherwise enabling the bingo symbol for play (e.g., advancing a bingo ball out of an ordered queue of bingo balls not yet enabled for play).

In accordance with some embodiments, one or more systems, apparatus, methods, articles of manufacture, and/or computer readable media may provide for one or more of the following functions: (i) generating, receiving, or accessing information about, and/or otherwise determining, a visible ball queue for a bingo game; (ii) receiving, or otherwise determining, a player indication or selection of at least one bingo ball of a visible ball queue; (iii) receiving, or otherwise determining, respective selections by a plurality of players of at least one bingo balls of a visible ball queue; (iv) ordering a plurality of bingo balls in a visible ball queue based on a selection of a bingo ball in the visible ball queue; (v) determining at least one special function associated with a bingo ball in a visible ball queue; and/or (vi) applying at least one special function associated with a bingo ball in a visible ball queue. In accordance with some embodiments, determining a visible ball queue may comprise one or more of: generating a displayed representation of at least one bingo ball in a queue, accessing a database storing information about a current state of a visible ball queue, and/or updating a visible ball queue on a user interface.

In accordance with some embodiments, one or more systems, apparatus, methods, articles of manufacture, and/or computer readable media may provide for one or more of the following functions: (i) determining a first ball for a bingo game; (ii) prior to allowing a player to play the first ball in the bingo game, displaying a representation of the first ball in a visible ball queue wherein the first ball is not playable in the bingo game; (iii) determining a second ball for the bingo game; (iv) prior to allowing a player to play the second ball in the bingo game, displaying a representation of the second ball in the visible ball queue wherein the second ball is not playable in the bingo game and advancing the first ball in the visible ball queue; and/or (v) after displaying the first ball in the visible ball queue, enabling the first ball for play in the bingo game.

In accordance with some embodiments, one or more systems, apparatus, methods, articles of manufacture, and/or computer readable media may provide for one or more of the following functions: (i) determining a first ball for a bingo game; (ii) determining a second ball for the bingo game; (iii) displaying a representation of the first ball in a visible ball queue wherein the first ball is not playable in the bingo game; (iv) displaying a representation of the second ball in the visible ball queue wherein the first ball is not playable in the bingo game; and/or (v) advancing the first ball out of the visible ball queue, wherein the first ball is playable in the bingo game.

According to one or more embodiments discussed in this disclosure, a ball queue for a bingo game indicates (e.g., displays to a player) one or more upcoming ball calls for the bingo game.

According to one or more embodiments, one or more balls in a ball queue may be referred to as "mystery balls", for which the call number is unknown to players (e.g., the ball call is represented in a displayed queue but the actual call number is not displayed).

According to one or more embodiments, one or more balls in a bingo game (e.g., displayed in a ball queue) may be a "special ball". According to some embodiments, a special ball may have one or more of the following characteristics: (i) it may be in sequence in a queue (e.g., in a visible queue) with one or more other "normal" balls; (ii) it may have an additional effect on one or more player bingo numbers or squares (e.g., when the corresponding number spot is daubed); (iii) a player may be able to see in advance that it will be called (e.g., by its being displayed in a visible ball queue); (iv) it may be associated with one or more special functions or features; and/or (v) it may be associated with one or more numbers and/or other types of bingo symbols (e.g., for comparing to and potentially matching to a player's bingo symbols).

In accordance with some embodiments, at least one function or step of a described process may be performed via a user interface (e.g., presented via a display of a mobile device or other type of computing device).

B. Terms and Definitions

Throughout this description unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. While not generally limiting and while not limiting for all described embodiments, in some embodiments, the terms are specifically limited to the example definitions and/or examples provided. Other terms are defined throughout the present description.

A "game", as the term is used in this disclosure (unless specified otherwise), may generally comprise any game (e.g., wagering or non-wagering, electronically playable over a network) playable by one or more players in accordance with specified rules. A game may be playable on a personal computer (PC) online in web browsers, on a game console and/or on a mobile device such as a smart-phone or tablet computer. "Gaming" thus generally refers to play of a game.

A "casual game", as the term is utilized in this disclosure (unless otherwise specified), may generally comprise a game with simple rules with little or no time commitment on the time of a player to play. A casual game may feature, for example, very simple game play such as a puzzle or Scrabble™ game, may allow for short bursts of play (e.g., during work breaks), an ability to quickly reach a final stage and/or continuous play without a need to save the game.

A "social network game", as used in this disclosure (unless specified otherwise), generally refers to (and in specific embodiments may be expressly limited to) a type of online game that is played through a social network, and in some embodiments may feature multiplayer and asynchronous game play mechanics. A "social network" may refer to an online service, online community, platform, or site that focuses on facilitating the building of social networks or social relations among people. A social network service may, for example, consist of a representation of each user (often a profile), his/her social links, and a variety of additional services. A social network may be web-based and provide means for users to interact over the Internet, such as e-mail and instant messaging. A social network game may in some embodiments be implemented as a browser game, but may also be implemented on other platforms such as mobile devices.

A "wagering game", as the term is used in this disclosure (unless specified otherwise), may generally comprise (and in specific embodiments may be expressly limited to) a game on which a player can risk a wager or other consideration, such as, but not limited to: slot games, poker games, blackjack, baccarat, craps, roulette, lottery, bingo, keno, casino war, etc. A wager may comprise a monetary wager in the form of an amount of currency or any other tangible or intangible article having some value which may be risked on an outcome of a wagering game. "Gambling" or "wagering" generally refers to play of a wagering game.

The term "game provider", as used in this disclosure (unless specified otherwise), generally refers to (and in specific embodiments may be expressly limited to) an entity or system of components which provides games for play and facilitates play of such game by use of a network such as the Internet or a proprietary or closed networks (e.g., an intranet or wide area network). For example, a game provider may operate a website which provides games in a digital format over the Internet. In some embodiments in which a game comprising a wagering game is provided, a game provider may operate a gambling website over which wagers are accepted and results of wagering games are provided.

As utilized in this disclosure, the term "player" may generally refer to (and in specific embodiments may be expressly limited to) any type, quantity, and or manner of entity associated with the play of a game. In some embodiments, a player may comprise an entity conducting play of an online game, for example, may comprise an entity that desires to play a game (e.g., an entity registered and/or scheduled to play and/ or an entity having expressed interest in the play of the game—e.g., a spectator) and/or may comprise an entity that configures, manages, and/or conducts a game. A player may be currently playing a game or have previously played the game, or may not yet have initiated play—i.e., a "player" may comprise a "potential player" (e.g., in general and/or with respect to a specific game). In some embodiments, a player may comprise a user of an interface (e.g., whether or not such a player participates in a game or seeks to participate in the game). In some embodiments, a player may comprise an individual (or group) that enters, joins, logs into, registers for, and/or otherwise access an online game room, session, server, and/or other particular instance and/or segmentation of an online game.

Some embodiments described in this disclosure are associated with a "player device" or a "network device". As used in this disclosure, a "player device" is a subset of a "network device". The "network device", for example, may generally refer to any device that can communicate via a network, while the "player device" may comprise a network device that is owned and/or operated by or otherwise associated with a player. Examples of player and/or network devices may include, but are not limited to: a PC, a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Player and/or network devices may, in some embodiments, comprise one or more network components.

As used in this disclosure, the term "network component" may refer to a player or network device, or a component, piece, portion, or combination of player or network devices. Examples of network components may include a Static Random Access Memory (SRAM) device or module, a network processor, and a network communication path, connection, port, or cable.

In addition, some embodiments are associated with a "network" or a "communication network." As used in this disclosure, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium such as the Internet, intranet, a Local Area Network (LAN), a Wide Area Network (WAN), a cellular telephone network, a Bluetooth® network, a Near-Field Communication (NFC) network, a Radio Frequency (RF) network, a Virtual Private Network (VPN), Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or system to system (S2S).

As used in this disclosure, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

The term "indication", as used in this disclosure (unless specified otherwise), may generally refer to any indicia and/or other information indicative of or associated with a subject, item, entity, and/or other object and/or idea. As used in this disclosure, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

A "session", as the term is used in this disclosure (unless indicated otherwise), may generally comprise (and in specific embodiments may be expressly limited to) a period of time spanning a plurality of event instances or turns of the game, the session having a defined start and defined end. An event instance or turn is triggered upon an initiation of, or request for, at least one result of the game by a player, such as an actuation of a "start" or "spin" mechanism, which initiation causes an outcome to be determined or generated (e.g., a random number generator is contacted or communicated with to identify, generate or determine a random number to be used to determine a result for the event instance).

As used in this disclosure, the terms "outcome" and "result" should be differentiated in the present description in that an "outcome" is generally a representation of a "result", typically comprising one or more game elements or game symbols. For example, in a "fruit themed" game, a winning outcome (i.e., an outcome corresponding to some kind of award, prize or payout) may comprise a combination of three "cherry" symbols. The "result" of this outcome may be a payout of X credits awarded to the player associated with the game. In another example, in a game in which a character moves along a game interface from a starting position to a finish position, an "outcome" of the game may comprise a symbol representing one or more movements along the interface and the "result" corresponding to this outcome may be the particular number and direction of the character's movement (e.g., three (3) spaces backwards such that the character ends up further away from the finish line). In a session embodiment, a session result may comprise a binary result (e.g., a player or game character wins or loses the session) and/or the particular award (or magnitude of award) won or earned by the player based on the session (e.g., the number of credits awarded to the player). It should be noted that the embodiments described in this disclosure encompass awards, prizes and payouts which are monetary, non-monetary, tangible or intangible.

As used in this disclosure, the term "virtual currency" may generally refer to an in-game currency that may be used as part of a game or one or more games provided by a game provider as (i) currency for making wagers, and/or (ii) to purchase or access various in-game items, features or powers.

A "credit balance", as the term is used in this disclosure (unless indicated otherwise), may generally refer to (i) a balance of currency, whether virtual currency and/or real currency, usable for making wagers in a game and/or (ii) another tracking mechanism for tracking a player's success or advancement in a game by deducting there from points or value for unsuccessful attempts at advancement and adding thereto points or value for successful attempts at advancement.

Some embodiments are descriptive of an "array" or "matrix" of symbols or game outcomes. As utilized in this disclosure, the terms "array" and "matrix" generally refer to a group of symbols, numbers, and/or expressions arranged in a plurality of rows and columns (or that can be readily and appropriately represented mathematically as being so arranged). In some embodiments, the term "array" is utilized to refer to a multi-dimensional matrix or combination of matrices while the term "matrix" is utilized to refer to a two-dimensional set of symbols or numbers (e.g., bingo tickets, slot reel symbols and/or mathematical representations thereof). According to some embodiments, such as in the case that an array and/or matrix is populated with graphical game symbols, the array or matrix may be output and/or displayed (e.g., transmit to and/or rendered on a player device) as part of a game session.

Some embodiments of this disclosure relate to bingo games and/or computer software applications for providing bingo games. Some embodiments of this disclosure relate to gaming networks for providing bingo games, including social network games, single player games and/or multiplayer games.

According to some embodiments, a bingo game is provided in which a player uses one or more cards (or tickets, or other type of physical or electronic game play area or game space) that include symbols (e.g., alphanumeric characters and/or other types of identifiers) assigned to respective spaces or other designated areas on the card. One or more symbols are drawn, selected, or otherwise determined from a set of symbols available for the bingo game, and, in accordance with some embodiments, the drawn symbols are compared to the symbols designated on the card to see if there are any matches. It will be readily understood that a set of symbols for a bingo game may include any range of numbers, multiple ranges of numbers, a non-sequential range of numbers, alphanumeric characters, non-numeric symbols, letters, punctuation marks, and/or any other representation of information.

According to some embodiments, for a given bingo game, the distribution of bingo symbols across cards, and/or the distribution of the tickets across players, may be in accordance with one or more distribution algorithms and/or at random. In some embodiments, a bingo system generates all possible combinations of available bingo symbols as cards, and distributes all of the possible cards before distributing any repeat cards.

According to some embodiments, if marked (or "daubed") spaces on a card form one or more previously designated arrangements (a "bingo pattern" or "winning pattern"), the card may be deemed a winning card and/or the player may be eligible for a prize. In one example, a player may win a prize by calling "Bingo" for a card with a winning pattern (e.g., by clicking a "Bingo" button of a game interface to indicate the player thinks his electronic bingo card includes a winning bingo pattern). "Daubed" or "marked" will be used synonymously in this disclosure to refer to spaces, symbols, numbers, etc., on a card that have been marked, covered, stamped, daubed, highlighted, or otherwise identified physically, visually, and/or graphically, as potentially contributing to a winning pattern (e.g., alone or in combination with one or more other marked spaces). In some embodiments, spaces are daubed (e.g., automatically by a gaming device and/or manually by a player) if they match symbols drawn for a bingo game. Alternatively, or in addition, one or more spaces may be daubed without requiring that the space match a drawn symbol (a "free" daub or mark). For example, a card may have one or more free daubs automatically prior to the start of play (e.g., the center square of a 5×5 grid may be pre-marked with a free daub) and/or anytime during play (e.g., by receiving a free random daub in accordance with a game rule).

According to one embodiment, a card includes spaces arranged in columns and rows (e.g., a 5×5 grid of spaces, a 3×4 array of ticket lines), each having a designated number (e.g., selected from a set of bingo numbers 1-75) represented in a respective space on the card.

According to some embodiments, one or more symbols for a bingo game may be associated with a symbol identifier that identifies the symbol (e.g., a unique bingo number) and with one or more types of symbol category identifiers that identify a category, group, and/or type associated with a symbol.

In accordance with one or more embodiments, a symbol category identifier may comprise a location identifier and/or a number category or group. According to some embodiments, each symbol for a bingo game may be associated with one or more respective location identifiers. In one embodiment, certain symbols may be designated only in certain areas of a game card. For example, the "B" column of a 5×5 card may only include numbers selected in the range of 1-15. In another example, the first column of a 90 ball bingo game ticket may only include numbers selected in the range of 1-10, the second column may only include numbers selected in the range of 11-20, and so on.

Accordingly, in some embodiments, a given bingo symbol may be associated with both a number (or a shape, color, or other type of symbol identifier that distinguishes it from other symbols) and location information (e.g., a column identifier, row identifier, and/or other type of location identifier) including information about where the symbol may appear on the card. In one example, a bingo ball may be associated with the number "3" and with a "B", indicating that if it appears on a card it would appear in a designated "B" column of spaces.

According to one embodiment, a card for a bingo game may include one or more types of location identifiers. Location identifiers may include, without limitation, one or more column identifiers, row identifiers, and/or other types of identifiers that uniquely identify a particular grid space, row, column, area, or other portion of a bingo card. For example, each column of a 5×5 bingo card may be identified respectively as "B", "I", "N", "G", or "O".

According to some embodiments, symbols may be represented (e.g., physically or electronically via a user interface) as numbered balls. Drawn numbers themselves may be referred to in this disclosure as "balls" for illustrative purposes and without limitation. As used in this disclosure, a "symbol draw" or "ball draw" may be used to refer to a process for selecting or otherwise determining (e.g., at random) numbers or other types of symbols drawn for use in comparing to symbols on a card for a bingo game. "Drawn balls" and "drawn numbers" may be used for convenience to refer to symbols selected in a symbol draw, and it will be understood that such terms are not limited to balls or numbers, but encompass any type of symbols drawn for a bingo game. Those of skill in the art will realize that the symbols used in an electronic bingo game may be displayed in any convenient fashion as deemed appropriate for a particular implementation, and that a simulated ball draw is merely one example. The number of balls drawn and the timing of ball draws may vary according to the desired type of bingo game.

According to some embodiments, a bingo game is played until at least one predetermined winning pattern is established on a bingo card. In some embodiments, determining whether a winning pattern is marked properly on a card may comprise determining whether each marked space may be compared to a set of drawn symbols to verify that it is a valid mark and therefore may qualify for or contribute to a winning pattern. In another example, determining if a marked pattern is a winning pattern may comprise determining whether any marked spaces are valid free daubs. According to some embodiments, a bingo game is played until a predetermined number of winning patterns are achieved (e.g., by one or more players) and/or until a time limit expires.

According to some embodiments, a player must identify any matches between drawn numbers and numbers designated on the player's card(s), the player must take action to daub spaces on the card (e.g., via a user interface) in order to form potential winning patterns, and/or the player must take action to declare a card has one or more winning patterns (e.g., by clicking a "Bingo" button). In one embodiment, one or more daubed spaces may be undaubed by a player and/or bingo game program. In one example, a player may undaub a space that the player mistakenly daubed. In some embodiments, one or more matching numbers may be daubed automatically and/or one or more winning patterns of marked spaces may be identified automatically (e.g., electronically by gaming device in accordance with instructions of a computer software program). Some embodiments may provide for automatic daubing of one or more spaces (e.g., for initial free daubs and/or random free daubs during play) and for manual daubing by the player of one or more spaces (e.g., in response to matching drawn numbers).

C. General Systems and Structures

Turning first to FIG. 1, a block diagram of a system 100 according to some embodiments is shown. In some embodiments, the system 100 may comprise a gaming platform such as a gaming platform via which one or more multiplayer and/or online games may be played (e.g., one or more bingo games as described in this disclosure). In some embodiments, the system 100 may comprise a plurality of player devices 102a-n in communication with and/or via a network 104. In some embodiments, a game server 110 may be in communication with the network 104 and/or one or more of the player devices 102a-n. In some embodiments, the game server 110 (and/or the player devices 102a-n) may be in communication with a database 140. The database 140 may store, for example, game data (e.g., processed and/or defined by the game server 110), data associated with players (not explicitly shown) owning and/or operating the player devices 102a-n, and/or instructions that cause various devices (e.g., the game server 110 and/or the player devices 102a-n) to operate in accordance with embodiments described in this disclosure.

According to some embodiments, any or all of the components 102a-n, 104, 110, 140 of the system 100 may be similar in configuration and/or functionality to any similarly named and/or numbered components described in this disclosure. Fewer or more components 102a-n, 104, 110, 140 (and/or portions thereof) and/or various configurations of the components 102a-n, 104, 110, 140 may be included in the system 100 without deviating from the scope of embodiments described in this disclosure. While multiple instances of some components 102a-n are depicted and while single instances of other components 104, 110, 140 are depicted, for example, any component 102a-n, 104, 110, 140 depicted in the system 100 may comprise a single device, a combination of devices and/or components 102a-n, 104, 110, 140, and/or a plurality of devices, as is or becomes desirable and/or practicable. Similarly, in some embodiments, one or more of the various components 102a-n, 104, 110, 140 may not be needed and/or desired in the system 100.

The player devices 102a-n, in some embodiments, may comprise any type or configuration of electronic, mobile electronic, and or other network and/or communication devices (or combinations thereof) that are or become known or practicable. A first player device 102a may, for example, comprise one or more PC devices, computer workstations (e.g., game consoles and/or gaming computers), tablet computers, such as an iPad® manufactured by Apple®, Inc. of Cupertino, Calif., and/or cellular and/or wireless telephones such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, one or more of the player devices 102a-n may be specifically utilized and/or configured (e.g., via specially-programmed and/or stored instructions such as may define or comprise a software application) to communicate with the game server 110 (e.g., via the network 104). In some embodiments, a game server 110 may be in communication with a variety of different types of player devices 102a-n.

The network 104 may, according to some embodiments, comprise a LAN, WAN, cellular telephone network, Bluetooth® network, NFC network, and/or RF network with communication links between the player devices 102a-n, the game server 110, and/or the database 140. In some embodiments, the network 104 may comprise direct communications links between any or all of the components 102a-n, 110, 140 of the system 100. The game server 110 may, for example, be directly interfaced or connected to the database 140 via one or more wires, cables, wireless links, and/or other network components, such network components (e.g., communication links) comprising portions of the network 104. In some embodiments, the network 104 may comprise one or many other links or network components other than those depicted in FIG. 1. A second player device 102b may, for example, be connected to the game server 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102a-n, 110, 140 of the system 100. The network 104 may comprise one or more cellular telephone networks with communication links between the player devices 102a-n and the game server 110, for example, and/or may comprise the Internet, with communication links between the player devices 102a-n and the database 140, for example.

According to some embodiments, the game server 110 may comprise a device (and/or system) owned and/or operated by or on behalf of or for the benefit of a gaming entity (not explicitly shown). The gaming entity may utilize player and/or game information or instructions (e.g., stored by the database 140), in some embodiments, to host, manage, analyze, design, define, price, conduct, and/or otherwise provide (or cause to be provided) one or more games such as online multiplayer games (e.g., one or more bingo games as described in this disclosure). In some embodiments, the gaming entity (and/or a third-party; not explicitly shown) may provide an interface (not shown in FIG. 1) to and/or via the player devices 102a-n. The interface may be configured, according to some embodiments, to allow and/or facilitate electronic game play by one or more players. In some embodiments, the system 100 (and/or interface provided by the game server 110) may present game data (e.g., from the database 140) in such a manner that allows players to participate in one or more online games (singularly, in/with groups, and/or otherwise). According to some embodiments, the game server 110 may cause and/or facilitate various functionality and/or features of one or more bingo games, each as described in this disclosure.

In some embodiments, the database 140 may comprise any type, configuration, and/or quantity of data storage devices that are or become known or practicable. The database 140 may, for example, comprise an array of optical and/or solid-state hard drives configured to store player and/or game data, and/or various operating instructions, drivers, etc. While the database 140 is depicted as a stand-alone component of the system 100 in FIG. 1, the database 140 may comprise multiple components. In some embodiments, a multi-component database 140 may be distributed across various devices and/or may comprise remotely dispersed components. Any or all of the player devices 102a-n may comprise the database 140 or a portion thereof, for example, and/or the game server 110 may comprise the database 140 or a portion thereof.

According to some embodiments, any or all of the player devices 102a-n in conjunction with one or more of the game server 110 and/or the database 140 (e.g., via the network 104) may conduct (in whole or in part), facilitate, and/or otherwise be associated with execution of one or more stored procedures, applications, processes, and/or methods (e.g., the methods 800, 900 and 1000 in this disclosure, and/or one or more portions and/or combinations thereof) as described in this disclosure.

In some embodiments a game server 110 and/or one or more of the player devices 102a-n stores and/or has access to data useful for facilitating play of a game. For example, game server 110 and/or a player device 102a-n may store (i) one or more probability databases for determining one or more outcome(s) for a game, (ii) a current state or status of a game or game session, (iii) one or more user interfaces for use in a game, (iv) one or more game themes for a game and/or (v) profiles or other personal information associated with a player of a game. It should be noted that in some embodiments such data may be stored on the game server 110 and information based on such data may be output to a player device 102a-n during play of a game while in other embodiments a game program may be downloaded to a local memory of a player device 102a-n and thus such data may be stored on a player device 102a-n (e.g., in encrypted or other secure or tamper-resistant form).

According to some embodiments, a game server 110 may comprise a computing device for facilitating play of a game (e.g., by receiving an input from a player, determining an outcome for a game, causing an outcome of a game to be displayed on a player device, facilitating a wager and/or a provision of a payout for a game). For example, the game server 110 may comprise a server computer operated by a game provider or another entity (e.g., a social network website). In some embodiments, the game server may determine an outcome for a first aspect and/or second aspect of a game by requesting and receiving such an outcome from another remote server operable to provide such outcomes. In some embodiments, the game server 110 may further be operable to facilitate a game program for a game (e.g., a wagering game). In accordance with some embodiments, in addition to administering or facilitating play of a game, a game server 110 may comprise one or more computing devices responsible for handling online processes such as, but not limited to: serving a website comprising one or more games to a player device and/or processing transactions (e.g., wagers, deposits into financial accounts, managing accounts, controlling games, etc.). In some embodiments, game server 110 may comprise two or more server computers operated by the same entity (e.g., one server being primarily for storing states of games in progress and another server being primarily for storing mechanisms for determining outcomes of games, such as a random number generator).

Examples of processes that may be performed by the game server 110 (directly or indirectly) may include, but are not limited to: (i) determining a set of available numbers and/or other types of bingo symbols for a bingo game; (ii) conducting a symbol draw or otherwise determining or selecting (e.g., at random) which symbols, of a plurality of bingo symbols available (e.g., depending on the type of bingo game), are drawn for a particular round of a bingo game; (iii) transmitting an indication of at least one drawn symbol to a player device; (iv) determining one or more drawn symbols that are in play for a bingo game (e.g., that previously may have been visible and/or queued but not yet available for play); (v) transmitting an indication of at least one drawn and queued symbol to a player device; (vi) determining and/or transmitting (e.g., to a player device) one or more cards, tickets, or other type of bingo game space for a bingo game; (vii) determining one or more players of a bingo game; (viii) determining and/or establishing at least one winning pattern for a bingo game; (ix) determining at least one bingo card having at least one valid winning pattern (e.g., of daubed spaces); (x) determining an outcome of a bingo game; (xi) transmitting an indication of an outcome of a bingo game to a player device; (xii) determining one or more drawn symbols that are queued to be enabled for play in a bingo game (e.g., but are not yet available for play); (xiii) determining one or more drawn symbols for which respective visual representations are (or are to be) made visible to one or more players; (xiv) authorizing a game program to be downloaded to a player device; and/or (xv) modifying (and/or directing a player device to modify) a game interface (e.g., to provide for electronic gaming).

A player device 102a-n may be used to play a wagering or non-wagering game (e.g., a social or casual game) over a network and output information relating to the game to players participating in the game (e.g., outcomes for a round of a bingo game, special numbers for a player, qualifying for a level upgrade in the game, balance of credits available for play of the game, etc.). Any and all information relevant to any of the aforementioned functions may be stored locally on one or more of the player devices 102a-n and/or may be accessed using one or more of the player devices 102a-n (in one embodiments such information being stored on, or provided via, the game server 110). In another embodiment, a player device 102a-n may store some or all of the program instructions for providing one or more of the functions described with respect to game server 110 (e.g., in a downloadable software application). In some embodiments, the game server 110 may be operable to authorize the one or more player devices 102a-n to access such information and/or program instructions remotely via the network 104 and/or download from the game server 110 (e.g., directly or via an intermediary server such as a web server) some or all of the program code for executing one or more of the various functions described in this disclosure. In other embodiments, outcome and result determinations may be carried out by the game server 110 (or another server with which the game server 110 communicates) and the player devices 102*a-n* may be terminals for displaying to an associated player such outcomes and results and other graphics and data related to a game.

It should be noted that the one or more player devices 102*a-n* may each be located at the same location as at least one other player device 102*a-n* (e.g., such as in a casino or internet café) or remote from all other player devices 102*a-n*. Similarly, any given player device may be located at the same location as the game server 110 or may be remote from the game server 110. It should further be noted that while the game server 110 may be useful or used by any of the player devices 102*a-n* to perform certain functions described in this disclosure, the game server 110 need not control any of the player devices 102*a-n*. For example, in one embodiment the game server 110 may comprise a server hosting a website of an online casino accessed by one or more of the player devices 102*a-n*.

In one embodiment, a game server 110 may not be necessary or desirable. For example, some embodiments described in this disclosure may be practiced on one or more player devices 102*a-n* without a central authority. In such an embodiment, any functions described in this disclosure as performed by a game server 110 and/or data described as stored on a game server 110 may instead be performed by or stored on one or more player devices 102*a-n*. Additional ways of distributing information and program instructions among one or more player devices 102*a-n*, a game server 110 and/or another server device will be readily understood by one skilled in the art upon contemplation of the present disclosure.

Figure 2:
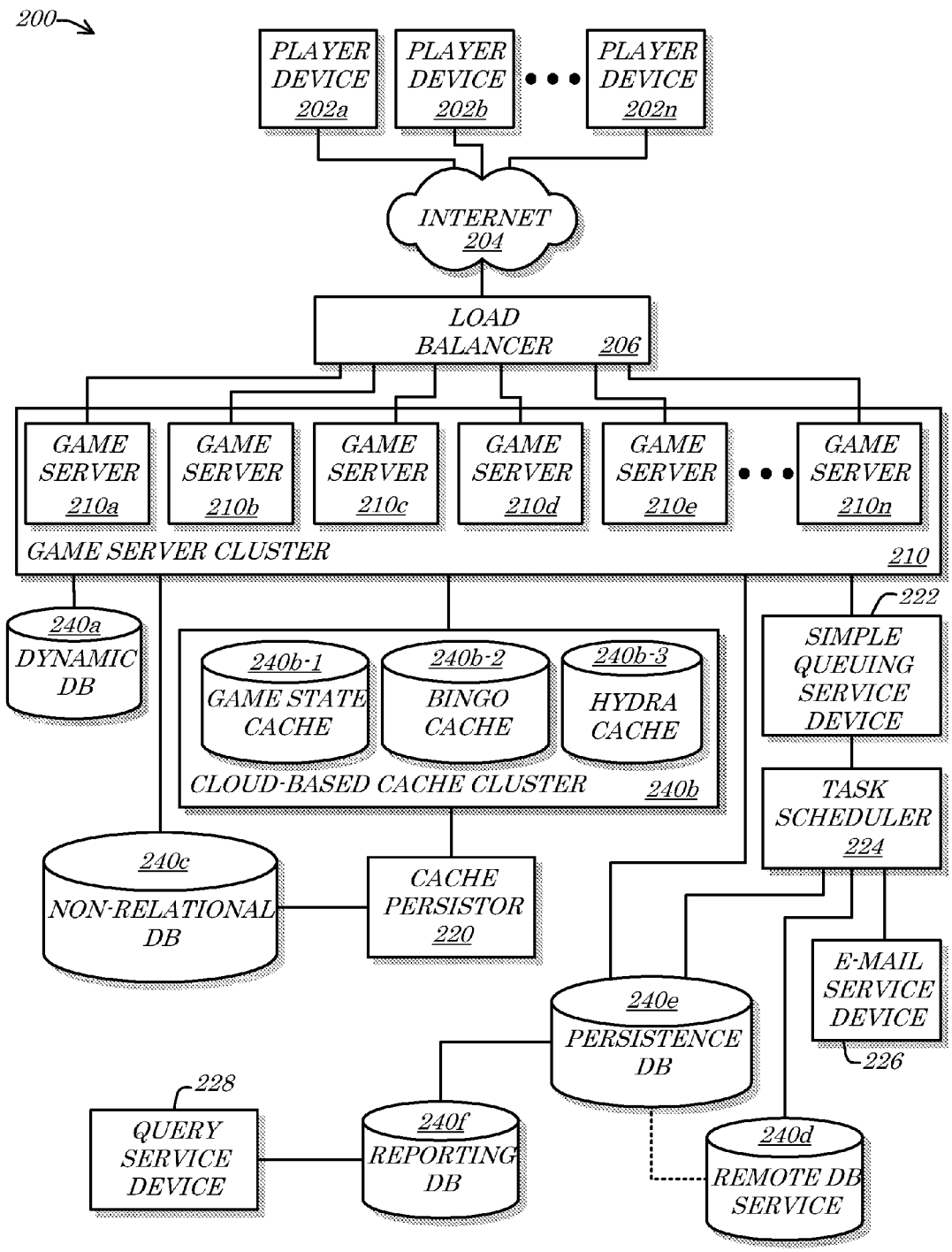
FIG. 2 is a block diagram of a system according to one or more embodiments.

Referring now to FIG. 2, a block diagram of a system 200 according to some embodiments is shown. In some embodiments, the system 200 may comprise a gaming platform such as a platform via which social, multiplayer, and/or online games may be played (e.g., one or more bingo games as described in this disclosure). In some embodiments, the system 200 may comprise a plurality of player devices 202*a-n*, the Internet 204, a load balancer 206, and/or a game server cluster 210. The game server cluster 210 may, in some embodiments, comprise a plurality of game servers 210*a-n*. In some embodiments, the system 200 may comprise a cache persistor 220, a Simple Queuing Service (SQS) device 222, a task scheduler 224, an e-mail service device 226, and/or a query service device 228. As depicted in FIG. 2, any or all of the various components 202*a-n*, 204, 206, 210*a-n*, 220, 222, 224, 226, 228 may be in communication with and/or coupled to one or more databases 240*a-f*. The system 200 may comprise, for example, a dynamic database (DB) 240*a*, a cloud-based cache cluster 240*b* (e.g., comprising a game state cache 240*b*-1, a bingo cache 240*b*-2, and/or a "hydra" cache 240*b*-3), a non-relational DB 240*c*, a remote DB service 240*d*, a persistence DB 240*e*, and/or a reporting DB 240*f*.

According to some embodiments, any or all of the components 202*a-n*, 204, 206, 210*a-n*, 220, 222, 224, 226, 228, 240*a-f* of the system 200 may be similar in configuration and/or functionality to any similarly named and/or numbered components described in this disclosure. Fewer or more components 202*a-n*, 204, 206, 210*a-n*, 220, 222, 224, 226, 228, 240*a-f* (and/or portions thereof) and/or various configurations of the components 202*a-n*, 204, 206, 210*a-n*, 220, 222, 224, 226, 228, 240*a-f* may be included in the system 200 without deviating from the scope of embodiments described in this disclosure. While multiple instances of some components 202*a-n*, 210*a-n*, 240*a-f* are depicted and while single instances of other components 204, 206, 220, 222, 224, 226, 228 are depicted, for example, any component 202*a-n*, 204, 206, 210*a-n*, 220, 222, 224, 226, 228, 240*a-f* depicted in the system 200 may comprise a single device, a combination of devices and/or components 202*a-n*, 204, 206, 210*a-n*, 220, 222, 224, 226, 228, 240*a-f*, and/or a plurality of devices, as is or becomes desirable and/or practicable. Similarly, in some embodiments, one or more of the various components 202*a-n*, 204, 206, 210*a-n*, 220, 222, 224, 226, 228, 240*a-f* may not be needed and/or desired in the system 200.

According to some embodiments, the player devices 202*a-n* may be utilized to access (e.g., via the Internet 204 and/or one or more other networks not explicitly shown) content provided by the game server cluster 210. The game server cluster 210 may, for example, provide, manage, host, and/or conduct various online and/or otherwise electronic games such as online bingo, slot-style games, poker, and/or other games of chance, skill, and/or combinations thereof. In some embodiments, the various game servers 210*a-n* (virtual and/or physical) of the game server cluster 210 may be configured to provide, manage, host, and/or conduct individual instances and/or sessions of available game types. A first game server 210*a*, for example, may host a first particular session of an online bingo game (or tournament), a second game server 210*c* may host a second particular session of an online bingo game (or tournament), a third game server 210*c* may facilitate an online poker tournament (e.g., and a corresponding plurality of game sessions that comprise the tournament), and/or a fourth game server 210*d* may provide an online slots game (e.g., by hosting one or more slot game sessions).

In some embodiments, the player devices 202*a-n* may comprise various components (hardware, firmware, and/or software; not explicitly shown) that facilitate game play and/or interaction with the game server cluster 210. The player device 202*a-n* may, for example, comprise a gaming client such as a software application programmed in Adobe® Flash® and/or HTML 5 that is configured to send requests to, and receive responses from, one or more of the game servers 210*a-n* of the game server cluster 210. In some embodiments, such an application operating on and/or via the player devices 202*a-n* may be configured in Model-View-Controller (MVC) architecture with a communication manager layer responsible for managing the requests to/responses from the game server cluster 210. In some embodiments, one or more of the game servers 210*a-n* may also or alternatively be configured in a MVC architecture with a communication manager and/or communications management layer (not explicitly shown in FIG. 2). In some embodiments, communications between the player devices 202*a-n* and the game server cluster 210 may be conducted in accordance with the Hypertext Transfer Protocol (HTTP) version 1.1 (HTTP/1.1) as published by the Internet Engineering Taskforce (IET) and the World Wide Web Consortium (W3C) in RFC 2616 (June 1999).

According to some embodiments, communications between the player devices 202*a-n* and the game server cluster 210 may be managed and/or facilitated by the load balancer 206. The load balancer 206 may, for example, route communications from player devices 202*a-n* to one or more of the specific game servers 210*a-n* depending upon various attributes and/or variables such as bandwidth availability (e.g., traffic management/volumetric load balancing), server load (e.g., processing load balancing), server functionality (e.g., contextual awareness/availability), and/or player-server history (e.g., session awareness/"stickiness"). In some embodiments, the load balancer 206 may comprise one or more devices and/or services provided by a third-party (not separately shown in FIG. 2). The load balancer 206 may, for example, comprise an Elastic Load Balancer (ELB) service provided by Amazon® Web Services, LLC of Seattle, Wash. According to some embodiments, such as in the case that the load balancer 206 comprises the ELB or a similar service, the load balancer 206 may manage, set, determine, define, and/or otherwise influence the number of game servers 210a-n within the game server cluster 210. In the case that traffic and/or requests from the player devices 202a-n only require the first and second game servers 210a-b, for example, all other game servers 210c-n may be taken off-line, may not be initiated and/or called, and/or may otherwise not be required and/or utilized in the system 200. As demand increases (and/or if performance, security, and/or other issues cause one or more of the first and second game servers 210a-b to experience detrimental issues), the load balancer 206 may call and/or bring online one or more of the other game servers 210c-n depicted in FIG. 2. In the case that each game server 210a-n comprises an instance of an Amazon® Elastic Compute Cloud (EC2) service, the load balancer 206 may add or remove instances as is or becomes practicable and/or desirable.

In some embodiments, the load balancer 206 and/or the Internet 204 may comprise one or more proxy servers and/or devices (not shown in FIG. 2) via which communications between the player devices 202a-n and the game server cluster 210 are conducted and/or routed. Such proxy servers and/or or devices may comprise one or more regional game hosting centers, for example, which may be geographically dispersed and addressable by player devices 202a-n in a given geographic proximity. In some embodiments, the proxy servers and/or devices may be located in one or more geographic areas and/or jurisdictions while the game server cluster 210 (and/or certain game servers 210a-n and/or groups of game servers 210a-n thereof) is located in a separate and/or remote geographic area and/or jurisdiction.

According to some embodiments, for specific game types such as bingo, the game server cluster 210 may provide game results (such as a full set of drawn bingo numbers and/or bonus metrics) to a controller device (not separately shown in FIG. 2) that times the release of game result information to the player devices 202a-n such as by utilizing a broadcaster device (also not separately shown in FIG. 2) that transmits the time-released game results to the player devices 202a-n (e.g., in accordance with the Transmission Control Protocol (TCP) and Internet Protocol (IP) suite of communications protocols (TCP/IP), version 4, as defined by "Transmission Control Protocol" RFC 793 and/or "Internet Protocol" RFC 791, Defense Advance Research Projects Agency (DARPA), published by the Information Sciences Institute, University of Southern California, J. Postel, ed. (September 1981)).

In some embodiments, the game server cluster 210 (and/or one or more of the game servers 210a-n thereof) may be in communication with the dynamic DB 240a. According to some embodiments, the dynamic DB 240a may comprise a dynamically-scalable database service such as the DyanmoDB™ service provided by Amazon® Web Services, LLC. The dynamic DB 240a may, for example, store information specific to one or more certain game types (e.g., bingo games) provided by the game server cluster 210 such as to allow, permit, and/or facilitate reporting and/or analysis of such information.

According to some embodiments, the game server cluster 210 (and/or one or more of the game servers 210a-n thereof) may be in communication with the cloud-based cache cluster 240b. Game state information from the game server cluster 210 may be stored in the game state cache 240b-1; bingo state data (e.g., the current state of spaces (marked or unmarked) of a player's bingo card, history of called balls, information about ball call order, etc.) may be stored in the bingo cache 240b-2; and/or other game and/or player information (e.g., progressive data, referral data, player rankings, audit data) may be stored in the hydra cache 240b-3. In some embodiments, the cache persistor 220 may move and/or copy data stored in the cloud-based cache cluster 240b to the non-relational DB 240c. The non-relational DB 240c may, for example, comprise a SimpleDB™ service provided by Amazon® Wed Services, LLC. According to some embodiments, the game server cluster 210 may generally access the cloud-based cache cluster 240b as-needed to store and/or retrieve game-related information. The data stored in the cloud-based cache cluster 240b may generally comprise a subset of the newest or freshest data, while the cache persistor 220 may archive and/or store or move such data to the non-relational DB 240c as it ages and/or becomes less relevant (e.g., once a player logs-off, once a game session and/or tournament ends). The game server cluster 210 may, in accordance with some embodiments, have access to the non-relational DB 240c as-needed and/or desired. The game servers 210a-n may, for example, be initialized with data from the non-relational DB 240c and/or may store and/or retrieve low frequency and/or low priority data via the non-relational DB 240c.

In some embodiments, the SQS device 222 may queue and/or otherwise manage requests, messages, events, and/or other tasks or calls to and/or from the server cluster 210. The SQS device 222 may, for example, prioritize and/or route requests between the game server cluster 210 and the task scheduler 224. In some embodiments, the SQS device 222 may provide mini-game and/or tournament information to the server cluster 210. According to some embodiments, the task scheduler 224 may initiate communications with the SQS device 222, the e-mail service provider 226 (e.g., providing e-mail lists), the remote DB service 240d (e.g., providing inserts and/or updates), and/or the persistence DB 240e (e.g., providing and/or updating game, player, and/or other reporting data), e.g., in accordance with one or more schedules.

According to some embodiments, the persistence DB 240e may comprise a data store of live environment game and/or player data. The game server cluster 210 and/or the task scheduler 224 or SQS device 222 may, for example, store game and/or player data to the persistence DB 240e and/or may pull and/or retrieve data from the persistence DB 240e, as-needed and/or desired. The server cluster 210 may, according to some embodiments, provide and/or retrieve spin and/or other game event info and/or configuration information via the persistence DB 240e.

In some embodiments, the reporting DB 240f may be created and/or populated based on the persistence DB 240e. On a scheduled and/or other basis, for example, a data transformation and/or mapping program may be utilized to pull data from the live environment (e.g., the persistence DB 240e) into the reporting DB 240f. The query service 228 may then be utilized, for example, to query the reporting DB 240f, without taxing the live environment and/or production system directly accessible by the game server cluster 210.

According to some embodiments, any or all of the player devices 202a-n in conjunction with one or more of the game servers 210a-n and/or the databases 240a-f (e.g., via the network 204) may conduct (in whole or in part), facilitate, and/or otherwise be associated with execution of one or more stored procedures, applications, processes, and/or methods (e.g., the methods 800, 900 and 1000 in this disclosure, and/or one or more portions and/or combinations thereof) as described in this disclosure.

Figure 3:
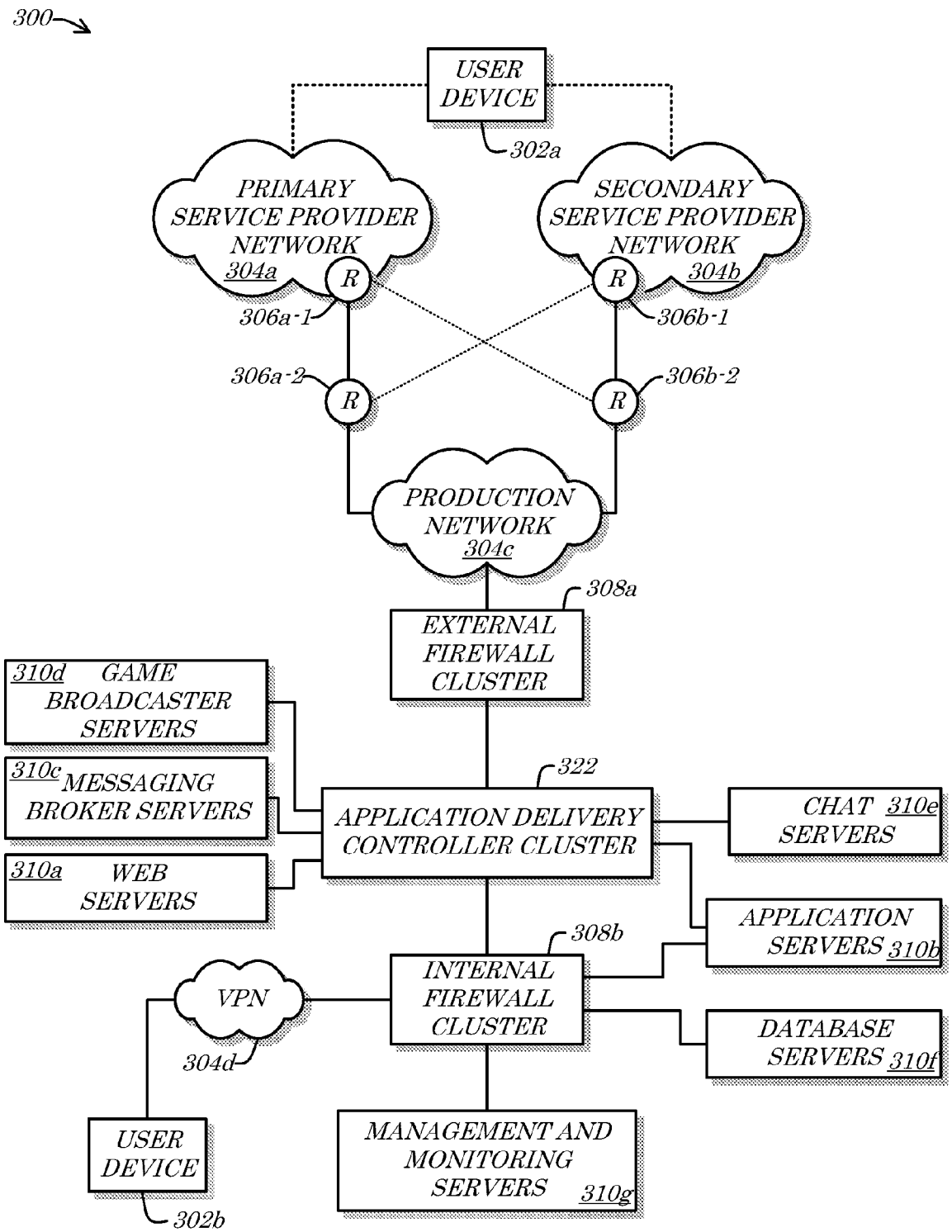
FIG. 3 is a block diagram of a system according to one or more embodiments.

Turning now to FIG. 3, a block diagram of a system 300 according to some embodiments is shown. In some embodiments, the system 300 may comprise and/or define a "front-end" architecture of a gaming platform such as a platform via which social, multiplayer, and/or online games may be played (e.g., one or more bingo games as described in this disclosure). In some embodiments, the system 300 may comprise a plurality of user devices 302a-b, a plurality of networks 304a-b (e.g., a primary service provider network 304a, a secondary service provider network 304b, a production network 304c, and/or a VPN 304d), a plurality of routers 306a-b, a plurality of firewall devices 308a-b, a plurality of game servers 310a-g (e.g., web servers 310a, application servers 310b, messaging broker servers 310c, game broadcaster servers 310d, chat servers 310e, database servers 310f, and/or management and monitoring servers 310g), and/or an application delivery controller cluster 322.

According to some embodiments, any or all of the components 302a-b, 304a-b, 306a-b, 308a-b, 310a-g, 322 of the system 300 may be similar in configuration and/or functionality to any similarly named and/or numbered components described in this disclosure. Fewer or more components 302a-b, 304a-b, 306a-b, 308a-b, 310a-g, 322 (and/or portions thereof) and/or various configurations of the components 302a-b, 304a-b, 306a-b, 308a-b, 310a-g, 322 may be included in the system 300 without deviating from the scope of embodiments described in this disclosure. While multiple instances of some components 302a-b, 304a-b, 306a-b, 308a-b, 310a-g are depicted and while single instances of other components 322 are depicted, for example, any component 302a-b, 304a-b, 306a-b, 308a-b, 310a-g, 322 depicted in the system 300 may comprise a single device, a combination of devices and/or components 302a-b, 304a-b, 306a-b, 308a-b, 310a-g, 322, and/or a plurality of devices, as is or becomes desirable and/or practicable. Similarly, in some embodiments, one or more of the various components 302a-b, 304a-b, 306a-b, 308a-b, 310a-g, 322 may not be needed and/or desired in the system 300.

In some embodiments, a first user device 302a may comprise an electronic device owned and/or operated by a player of an online game (not explicitly shown) and/or by an entity that otherwise accesses online game content and/or services externally (e.g., requiring external login and/or access credentials and/or procedures). The first user device 302a may, for example, be utilized to access content provided by and/or via the application delivery controller cluster 322. In some embodiments, the first user device 302a may interface with and/or connect to the production network 304c via the primary service provider network 304a and/or the secondary service provider network 304b. The primary service provider network 304a and the secondary service provider network 304b may, for example, load balance and/or provide redundant coverage for outage recovery by utilization of a first primary service provider network router 306a-1, a second primary service provider network router 306a-2, a first secondary service provider network router 306b-1, and/or a second secondary service provider network router 306b-2.

According to some embodiments, the application delivery controller cluster 322 may be insulated and/or protected from the production network 304c by an external firewall cluster 308a. The first user device 302a may, for example, be required to provide credentials to and/or otherwise access the application delivery controller cluster 322 via the external firewall cluster 308a.

In some embodiments, the application delivery controller cluster 322 may receive via and/or from the external firewall cluster 308a and/or the production network 304c, one or more requests, calls, transmissions, and/or commands from the first user device 302a. The first user device 302a may, for example, submit a call for an online gaming interface to the application delivery controller cluster 322. In some embodiments, the application delivery controller cluster 322 may comprise one or more hardware, software, and/or firmware devices and/or modules configured (e.g., specially-programmed) to route events and/or responses between the first user device 302a and one or more of the servers 310a-g. In the case that the first user device 302a is utilized to access an online gaming interface for example, one or more of the web servers 310a (e.g., that may provide graphical and/or rendering elements for an interface and/or other web services) and/or the application servers 310b (e.g., that may provide rule and/or logic-based programming routines, elements, and/or functions—e.g., game play engines) may be called and/or managed by the application delivery controller cluster 322.

In some embodiments, the messaging broker servers 310c may receive and/or retrieve messages from the first user device 302a (and/or from one or more of the other servers 310a-b, 310d-g) and perform one or more inter-application processes in relation thereto. The messaging broker servers 310c may, for example, route, transform, consolidate, aggregate, store, augment, and/or otherwise process one or more requests in connection with provision of online gaming services to the first user device 302a (e.g., facilitating a decoupling of services provided by various applications on and/or from the various servers 310a-b, 310d-g). According to some embodiments, the game broadcaster servers 310d may provide scheduled releases of information descriptive of an online game. The game broadcaster servers 310d may, for example, provide a broadcast feed of bingo numbers, slot and/or other random (and/or pseudo-random) number results that may be accessed by (and/or transmitted to) the first user device 302a (e.g., in connection with the play of an online bingo, slots, and/or other game for which broadcast information may be utilized). In some embodiments, the chat servers 310e may provide, manage, and/or facilitate communications between the first user device 302a (and/or first user thereof) and one or more other player/user devices (such as a second user device 302b and/or other player/user devices not shown in FIG. 3).

According to some embodiments, the second user device 302b may generally comprise an electronic device owned and/or operated by a user (not shown) closely affiliated with an entity that operates the system 300 (such entity also not shown). An employee (e.g., programmer and/or Customer Service Representative (CSR)), contractor, and/or other agent of an online gaming company may, for example, utilize the second user device 302b to interface with the privately-accessible VPN 304d. The VPN 304d may, for example, provide direct access to the application servers 310b, the database servers 310f, the management and monitoring servers 310g, and/or the application delivery controller cluster 322. In some embodiments (as depicted in FIG. 3), such access may be gated through and/or insulated or protected by an internal firewall cluster 308b. The second user device 302b may, for example, be required to provide credentials to and/or otherwise access the application delivery controller cluster 322 and/or servers 310a-g via the internal firewall cluster 308b.

In some embodiments, the database servers 310f may provide access to one or more databases and/or data stores (e.g., not shown in FIG. 3; for data storage and/or retrieval). In some embodiments, the management and monitoring servers 310g may provide services such as monitoring, reporting, troubleshooting, analysis, configuring, etc. to the second user device 302b. The second user device 302b may, for example, access the management and monitoring servers 310g and/or the database servers 310f to run reports descriptive of online gaming operations, game play, and/or game referral setup, management, and/or analysis. According to some embodiments, either or both of the user devices 302a-b in conjunction with one or more of the servers 310a-g and/or the application delivery controller cluster 322 may conduct (in whole or in part), facilitate, and/or otherwise be associated with execution of one or more stored procedures, applications, processes, and/or methods (e.g., the methods 800, 900 and 1000 in this disclosure, and/or one or more portions and/or combinations thereof).

Utilization of the term "server" with respect to the servers 310a-g of the system 300 of FIG. 3 is meant solely to ease description of the configuration and/or functionality of the servers 310a-g. The term "server" is not intended to be limiting with respect to any particular hardware, software, firmware, and/or quantities thereof utilized to implement any or all of the servers 310a-g of the system 300. Similarly, while multiple types and/or instances of the servers 310a-g are depicted in FIG. 3, any or all of the servers 310a-g may be implemented in, on, and/or by one or multiple computer server and/or other electronic devices.

Figure 4:
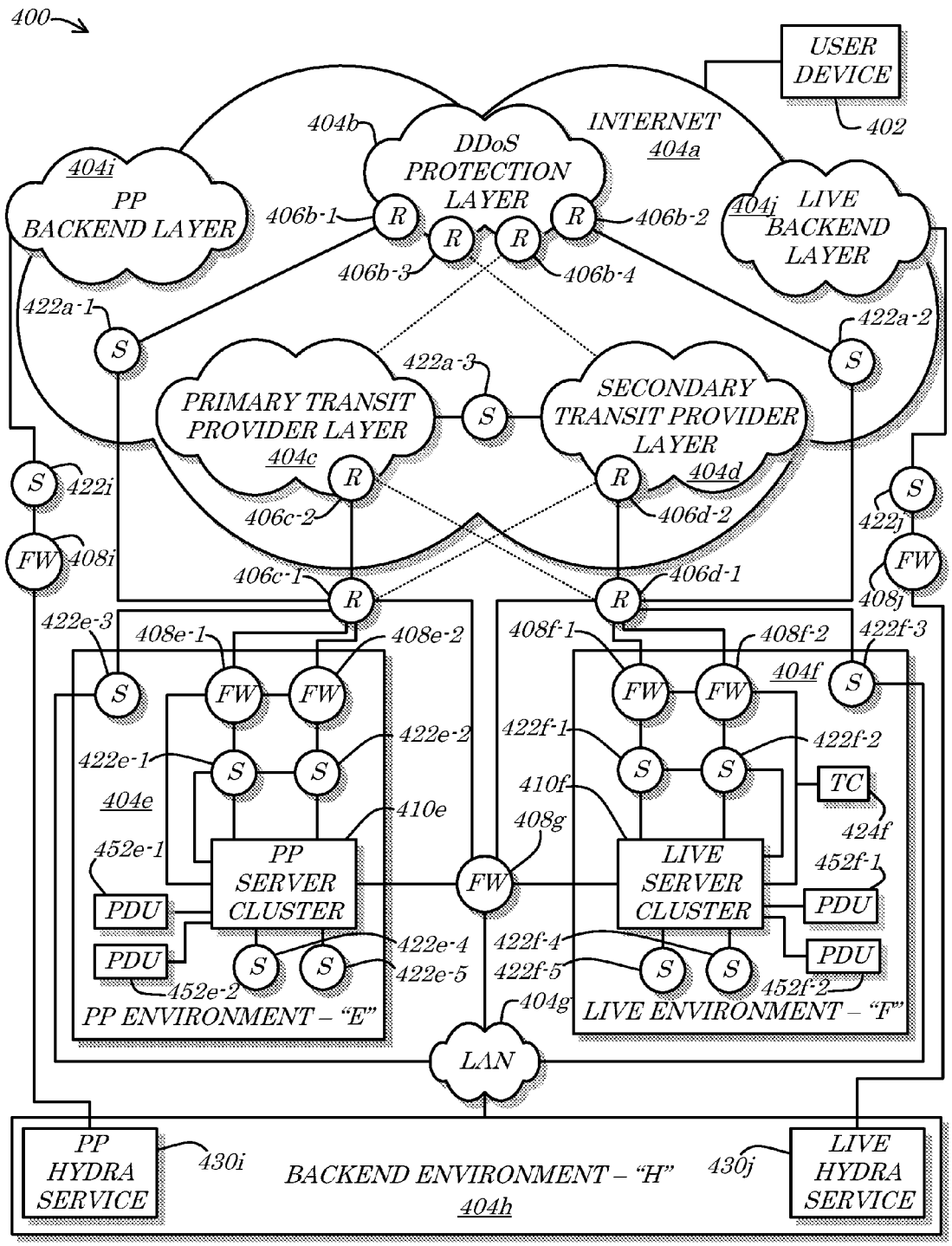
FIG. 4 is a block diagram of a system according to one or more embodiments.

Referring now to FIG. 4, a block diagram of a system 400 according to some embodiments is shown. In some embodiments, the system 400 may comprise and/or define a "front-end" architecture of a gaming platform such as a platform via which social, multiplayer, and/or online games may be played (e.g., one or more bingo games as described in this disclosure). The system 400 may be similar in configuration and/or functionality, for example, to the system 300 of FIG. 3 and/or one or more portions thereof. In some embodiments, the system 400 may comprise a user device 402, a plurality of networks (and/or environments and/or layers) 404a-j (e.g., the Internet 404a, a Distributed Denial-of-Service (DDoS) protection layer 404b, a primary transit provider layer 404c, a secondary transit provider layer 404d, a Pre-Production (PP) environment 404e, a live environment 404f, a LAN 404g, a backend environment 404h, a PP backend layer 404i, and/or a live backend layer 404j), a plurality of routers 406b-d, a plurality of firewall devices 408e-g, 408i-j, a plurality of servers 410e-f (e.g., a PP server cluster 410e and/or a live server cluster 410f), a plurality of switching devices 422a, 422e-f, 422i-j, a Terminal Concentrator (TC) 424f, a plurality of "hydra" services 430i-j (e.g., a PP hydra service 430i and/or a live hydra service 430j), and/or a plurality of Power Distribution Unit (PDU) devices 452e-f.

According to some embodiments, any or all of the components 402, 404a-j, 406b-d, 408e-g, 408i-j, 410e-f, 422a, 422e-f, 422i-j, 424f, 430i-j, 452e-f of the system 400 may be similar in configuration and/or functionality to any similarly named and/or numbered components described in this disclosure. Fewer or more components 402, 404a-j, 406b-d, 408e-g, 408i-j, 410e-f, 422a, 422e-f, 422i-j, 424f, 430i-j, 452e-f (and/or portions thereof) and/or various configurations of the components 402, 404a-j, 406b-d, 408e-g, 408i-j, 410e-f, 422a, 422e-f, 422i-j, 424f, 430i-j, 452e-f may be included in the system 400 without deviating from the scope of embodiments described in this disclosure. While multiple instances of some components 404a-j, 406b-d, 408e-g, 408i-j, 410e-f, 422a, 422e-f, 422i-j, 430i-j, 452e-f are depicted and while single instances of other components 402, 424f are depicted, for example, any component 402, 404a-j, 406b-d, 408e-g, 408i-j, 410e-f, 422a, 422e-f, 422i-j, 424f, 430i-j, 452e-f depicted in the system 400 may comprise a single device, a combination of devices and/or components 402, 404a-j, 406b-d, 408e-g, 408i-j, 410e-f, 422a, 422e-f, 422i-j, 424f, 430i-j, 452e-f, and/or a plurality of devices, as is or becomes desirable and/or practicable. Similarly, in some embodiments, one or more of the various components 402, 404a-j, 406b-d, 408e-g, 408i-j, 410e-f, 422a, 422e-f, 422i-j, 424f, 430i-j, 452e-f may not be needed and/or desired in the system 400.

In some embodiments, the user device 402 may be utilized to access one or more of the PP environment 404e, the live environment 404f, and/or the backend environment 404h via the Internet 404a. In some embodiments, the user device 402 may be utilized to access the backend environment 404h and/or the PP hydra service 430i via the PP backend layer 404i. A PP backend switch device 422i and/or a PP backend firewall device 408i may, for example, gate and/or control access to the backend environment 404h and/or the PP hydra service 430i, via the PP backend layer 404i. In some embodiments, the user device 402 may be utilized to access the backend environment 404h and/or the live hydra service 430j via the live backend layer 404j. A live backend switch device 422j and/or a live backend firewall device 408j may, for example, gate and/or control access to the backend environment 404h and/or the live hydra service 430j, via the live backend layer 404j.

According to some embodiments, any communications (e.g., requests, calls, and/or messages) from the user device 402 may be passed through the DDoS protection layer 404b. The DDoS protection layer 404b may, for example, monitor and/or facilitate protection against various forms of cyber attacks including, but not limited to, DDoS attacks. In some embodiments, the DDoS protection layer 404b may comprise and/or be in communication with a plurality of DDoS router devices 406b-1, 406b-2, 406b-3, 406b-4 that may be utilized to route and/or direct incoming communications (e.g., from the user device 402) to appropriate portions of the system 400.

In some embodiments, the DDoS protection layer 404b and/or a first DDoS router device 406b-1 may route communications from the user device 402 through and/or via a first switch device 422a-1 and/or to, through, and/or via a first primary transit provider router device 406c-1. In some embodiments, the first switch device 422a-1 may comprise a device utilized for security switching such as may implement communications in accordance with the Generic Routing Encapsulation (GRE) communications tunneling protocol described in RFC 2784 "Generic Routing Encapsulation (GRE)" published by the Network Working Group (NWG) in March, 2000. The first primary transit provider router device 406c-1 may, for example, provide access to the PP environment 404e and/or the PP server cluster 410e thereof, such as via one or more PP firewall devices 408e-1, 408e-2 and/or one or more PP switch devices 422e-1, 422e-2. According to some embodiments, the PP switch devices 422e-1, 422e-2 may comprise content switching devices that process and route data (e.g., in the data link layer) based on data content. In some embodiments, the first primary transit provider router device 406c-1 may direct communications to, through, and/or via a PP LAN switch device 422e-3 that provides and/or facilitates access to the LAN 404g. The LAN 404g may, for example, provide private access to and/or between the PP environment 404e, the live environment 404f, and/or the backend environment 404h. In some embodiments, the first primary transit provider router device 406c-1 and/or the PP LAN switch device 422e-3 may direct communications to, through, and/or via a LAN firewall device 408g that provides direct access to either or both of the PP server cluster 410e and the live server cluster 410f.

According to some embodiments, the DDoS protection layer 404*b* and/or a second DDoS router device 406*b*-2 may route communications from the user device 402 through and/or via a second switch device 422*a*-2 and/or to, through, and/or via a first secondary transit provider router device 406*d*-1. In some embodiments, the second switch device 422*a*-2 may comprise a device utilized for security switching such as may implement communications in accordance with the GRE communications tunneling protocol described in RFC 2784 "Generic Routing Encapsulation (GRE)" published by the Network Working Group (NWG) in March, 2000. The first secondary transit provider router device 406*d*-1 may, for example, provide access to the live environment 404*f* and/or the live server cluster 410*f* thereof, such as via one or more live firewall devices 408*f*-1, 408*f*-2 and/or one or more live switch devices 422*f*-1, 422*f*-2. According to some embodiments, the live switch devices 422*f*-1, 422*f*-2 may comprise content switching devices that process and route data (e.g., in the data link layer) based on data content. In some embodiments, the first secondary transit provider router device 406*d*-1 may direct communications to, through, and/or via a live LAN switch device 422*f*-3 that provides and/or facilitates access to the LAN 404*g*. In some embodiments, the first secondary transit provider router device 406*d*-1 and/or the live LAN switch device 422*f*-3 may direct communications to, through, and/or via the LAN firewall device 408*g* that provides direct access to either or both of the PP server cluster 410*e* and the live server cluster 410*f*.

In some embodiments, the DDoS protection layer 404*b* and/or one or more of a third DDoS router device 406*b*-3 and/or a fourth DDoS router device 406*b*-4 may route communications from the user device 402 through and/or via one or more of the primary transit provider layer 404*c* and/or the secondary transit provider layer 404*d*. In some embodiments, a transit provider switch device 422*a*-3 may direct, swap, route, and/or manage communications between the primary transit provider layer 404*c* and the secondary transit provider layer 404*d*. According to some embodiments, the transit provider switch device 422*a*-3 may comprise a switching device that operates in accordance with an Exterior Border Gateway Protocol (EBGP)—e.g., the transit provider switch device 422*a*-3 may comprise one or more edge or border routers. In some embodiments, the first primary transit provider router device 406*c*-1, the first secondary transit provider router device 406*d*-1, a second primary transit provider router device 406*c*-2, and/or a second secondary transit provider router device 406*d*-2 may be utilized to route and/or direct communications between (i) the primary transit provider layer 404*c* and/or the secondary transit provider layer 404*d* and (ii) the PP environment 404*e* and/or the live environment 404*f*.

According to some embodiments, the PP server cluster 410*e* and/or the PP environment 404*e* may comprise various hardware, software, and/or firmware that permits a user (e.g., of the user device 402) to program, edit, manage, and/or otherwise interface with PP game elements and/or interfaces (e.g., for development and/or testing purposes). In some embodiments, the PDU devices 452*e*-1, 452*e*-2 may generally provide power distribution, supply, management, backup, and/or conditioning services (e.g., to the PP server cluster 410*e*) as is or becomes desired. According to some embodiments, additional switch devices 422*e*-4, 422*e*-5 may be utilized to distribute, balance, manage and/or control communications to, from, and/or within the PP server cluster 410*e*.

In some embodiments, the live server cluster 410*f* and/or the live environment 404*f* may comprise various hardware, software, and/or firmware that permits a user (e.g., of the user device 402) to program, edit, manage, and/or otherwise interface with live game elements and/or interfaces (e.g., for troubleshooting, corrective, and/or live environment management purposes). In some embodiments, the PDU devices 452*f*-1, 452*f*-2 may generally provide power distribution, supply, management, backup, and/or conditioning services (e.g., to the live server cluster 410*f*) as is or becomes desired. According to some embodiments, additional switch devices 422*f*-4, 422*f*-5 may be utilized to distribute, balance, manage and/or control communications to, from, and/or within the live server cluster 410*f*. In some embodiments, the TC device 424*f* may be utilized to manage communications from a variety of data sources such as by providing communication capability between various communications channels (not separately depicted in FIG. 4).

According to some embodiments, the user device 402 in conjunction with the live server cluster 410*f* (e.g., via the Internet 404*a*) may conduct (in whole or in part), facilitate, and/or otherwise be associated with execution of one or more stored procedures, applications, processes, and/or methods (e.g., the methods 800, 900 and 1000 in this disclosure, and/or one or more portions and/or combinations thereof) as described in this disclosure.

Figure 5:
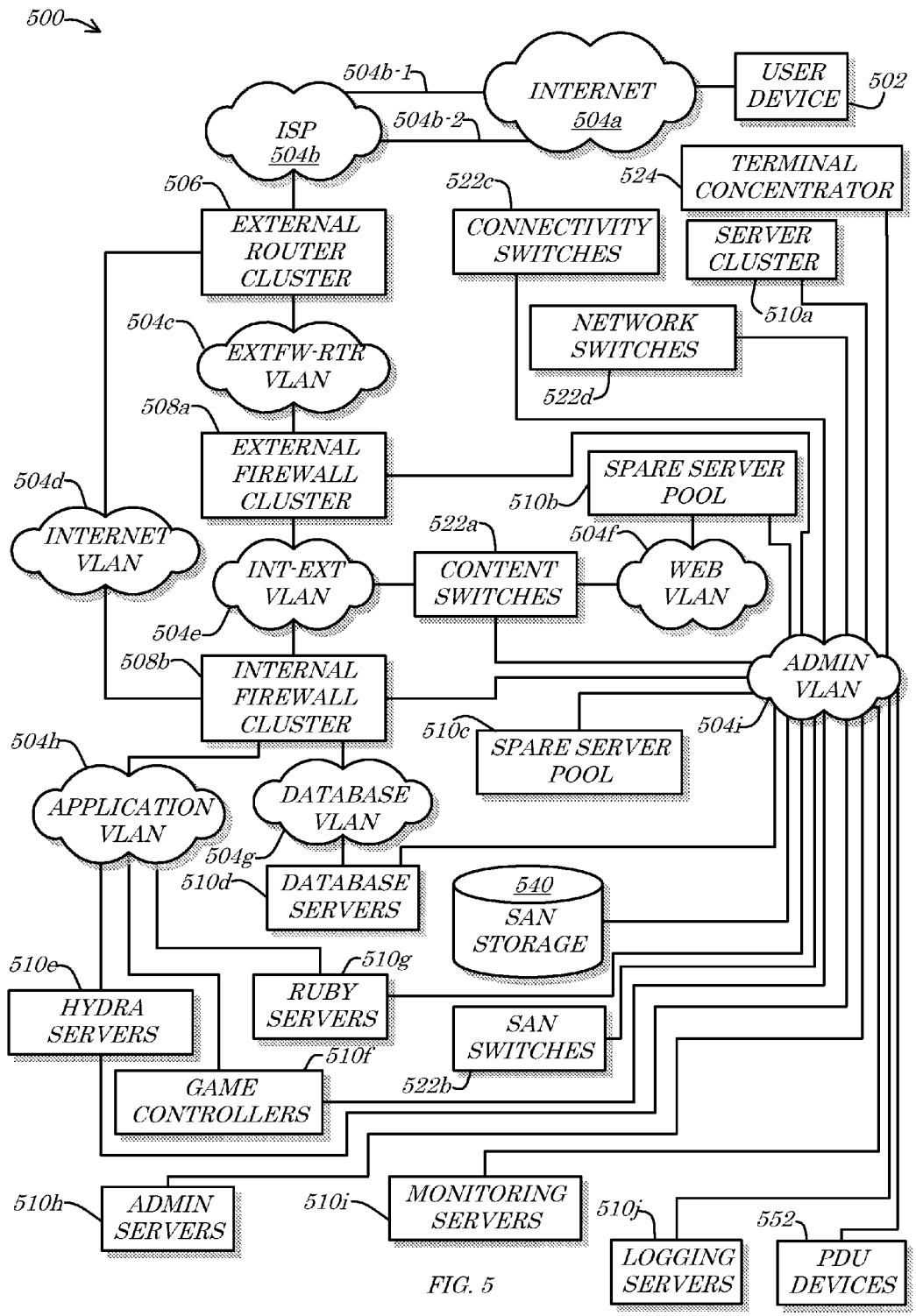
FIG. 5 is a block diagram of a system according to one or more embodiments.

Turning to FIG. 5, a block diagram of a system 500 according to some embodiments is shown. In some embodiments, the system 500 may comprise and/or define a "back-end" architecture of a gaming platform such as a platform via which social, multiplayer, and/or online games may be played (e.g., one or more bingo games as described in this disclosure). The system 500 may be utilized in conjunction with the systems 300, 400 if FIG. 3 and/or FIG. 4 in this disclosure, for example, and/or may be similar in configuration and/or functionality to the backend environment 404*h* of the system 400 of FIG. 4. In some embodiments, the system 500 may comprise a user device 502, a plurality of networks (and/or environments and/or layers) 504*a-i* (e.g., the Internet 504*a*, an ISP 504*b*, an External Firewall-Router (EXTFW-RTR) Virtual LAN (VLAN) 504*c*, an Internet VLAN 504*d*, an Internal-External (INT-EXT) VLAN 504*e*, a web VLAN 504*f*, a database VLAN 504*g*, an application VLAN 504*h*, and/or an administrator VLAN 504*i*), an external router cluster 506, a plurality of firewall clusters 508*a-b* (e.g., an external firewall cluster 508*a* and/or an internal firewall cluster 508*b*), a plurality of servers 510*a-j* (e.g., a server cluster 510*a*, a first spare server pool 510*b*, a second spare server pool 510*c*, database servers 510*d*, "hydra" servers 510*e*, game controllers 510*f*, ruby servers 510*g*, admin servers 510*h*, monitoring servers 510*i*, and/or logging servers 510*j*), a plurality of switches 522*a-d* (e.g., content switches 522*a*, Storage Area Network (SAN) switches 522*b*, connectivity switches 522*c*, and/or network switches 522*d*), a TC device 524, a SAN storage device 540, and/or one or more PDU devices 552.

According to some embodiments, any or all of the components 502, 504*a-l*, 506, 508*a-b*, 510*a-j*, 522*a-d*, 524, 540, 552 of the system 500 may be similar in configuration and/or functionality to any similarly named and/or numbered components described in this disclosure. Fewer or more components 502, 504*a-l*, 506, 508*a-b*, 510*a-j*, 522*a-d*, 524, 540, 552 (and/or portions thereof) and/or various configurations of the components 502, 504*a-l*, 506, 508*a-b*, 510*a-j*, 522*a-d*, 524, 540, 552 may be included in the system 500 without deviating from the scope of embodiments described in this disclosure. While multiple instances of some components 504*a-l*, 508*a-b*, 510*a-j*, 522*a-d* are depicted and while single instances of other components 502, 506, 524, 540, 552 are depicted, for example, any component 502, 504*a-i*, 506, 508*a-b*, 510*a-j*, 522a-d, 524, 540, 552 depicted in the system 500 may comprise a single device, a combination of devices and/or components 502, 504a-l, 506, 508a-b, 510a-j, 522a-d, 524, 540, 552, and/or a plurality of devices, as is or becomes desirable and/or practicable. Similarly, in some embodiments, one or more of the various components 502, 504a-l, 506, 508a-b, 510a-j, 522a-d, 524, 540, 552 may not be needed and/or desired in the system 500.

In some embodiments, the user device 502 may be utilized to access and/or interface with one or more of the servers 510a-j via the Internet 504a. In some embodiments, the Internet 502a may be linked to the ISP 504b via multiple (e.g., redundant) connectivity paths 504b-l, 504b-2 (e.g., for load balancing, security, and/or failure recovery). According to some embodiments, the ISP 504b may be in communication with (and/or comprise) the external router cluster 506. The external router cluster 506 may route certain requests, calls, and/or transmissions (and/or users—e.g., based on credentials and/or other information) through the EXTFW-RTR VLAN 504c and/or through the external firewall cluster 508a, for example, and/or may route certain requests, calls, and/or transmissions (and/or users—e.g., based on credentials and/or other information) through the Internet VLAN 504d and/or through the internal firewall cluster 508b.

In the case that a user (not shown) of the user device 502 comprises an online game player, consumer, and/or other member of the public, for example, the external router cluster 506 may direct communications through the EXTFW-RTR VLAN 504c and/or through the external firewall cluster 508a. In the case that the user of the user device 502 comprises a programmer, tester, employee, and/or other agent of an entity that operates the system 500, for example, the external router cluster 506 may direct communications through the Internet VLAN 504d and/or through the internal firewall cluster 508b. In some embodiments, access via either or both of the external firewall cluster 508a and/or the internal firewall cluster 508b may permit the user device 502 to communicate via the INT-EXT VLAN 504e. The INT-EXT VLAN 504e may, for example, provide access to the content switches 522a which may, in some embodiments, serve content from any or all of the servers 510a-j to the user device 502, as is or becomes appropriate or desired. In some embodiments, the content switches 522a may communicate with the first spare server pool 510b via the web LAN 504f.

According to some embodiments, private and/or other specialized access to the system 500 via the internal firewall cluster 508b may permit the user device 502 to communicate via one or more of the database VLAN 504g, the application VLAN 504h, and/or the admin VLAN 504i. The database VLAN 504g may be utilized, for example, to access and/or communicate with the database servers 510d. In some embodiments, the application VLAN 504h may be utilized to access and/or communicate with any or all of the hydra servers 510e, the game controllers 510f, and/or the ruby servers 510g.

The admin VLAN 504i may allow, promote, conduct, facilitate, and/or manage a wide variety of communications within the system 500. The admin VLAN 504i may, for example, communicatively connect and/or couple any or all of the firewalls 508a-b, the servers 510a-j, the switches 522a-d, the TC device 524, the SAN storage 540, and/or the PDU devices 552. The user device 502 may be utilized, in conjunction with the admin servers 510h and/or via the admin VLAN 504i for example, to define, edit, adjust, manage, and/or otherwise access settings (and/or data) of the firewalls 508a-b, any or all of the switches 522a-d, the TC device 524, and/or the PDU devices 552. In some embodiments, the user device 502 (and/or the admin servers 510h) may be utilized to manage and/or access content, rules, settings, and/or performance characteristics or preferences for any or all of the servers 510a-j.

In some embodiments, the server cluster 510a may comprise one or more servers and/or other electronic controller devices (e.g., blade servers) configured to provide online gaming data (e.g., interfaces, outcomes, and/or results) to the user device 502. According to some embodiments, the first spare server pool 510b and/or the second spare server pool 510c may comprise one or more server and/or other electronic controller devices configured to supplement and/or replace the server cluster 510a as needed and/or desired (e.g., to manage load and/or error recovery situations). In some embodiments, the database servers 510c may provide and/or manage access to stored data such as data stored in and/or by the SAN storage device 540. In some embodiments, the hydra servers 510e and/or the game controllers 510f may provide online game information such as interfaces, results, graphics, sounds, and/or other media to the user device 502 (e.g., via the application VLAN 504h). In some embodiments, the ruby servers 510g may comprise one or more processing devices configured to provide access to one or more programming languages (e.g., "Ruby") and/or Application Programming Interface (API) mechanisms via which the servers 510a-j and/or other portions of the system 500 may be configured to operate (e.g., in accordance with specially and/or pre-programmed instructions written in the programming language and/or developed by the API provided by the ruby servers 510g). According to some embodiments, the admin servers 510h, the monitoring servers 510i, and/or the logging servers 510j may be utilized and/or configured to provide administrative, parameter and/or metric monitoring and/or reporting, and/or data logging and/or audit services, respectively.

According to some embodiments, the user device 502 in conjunction with one or more of the servers 510a-j (e.g., via the Internet 504a) may conduct (in whole or in part), facilitate, and/or otherwise be associated with execution of one or more stored procedures, applications, processes, and/or methods (e.g., the methods 800, 900 and 1000 in this disclosure, and/or one or more portions and/or combinations thereof) as described in this disclosure.

Figure 6:
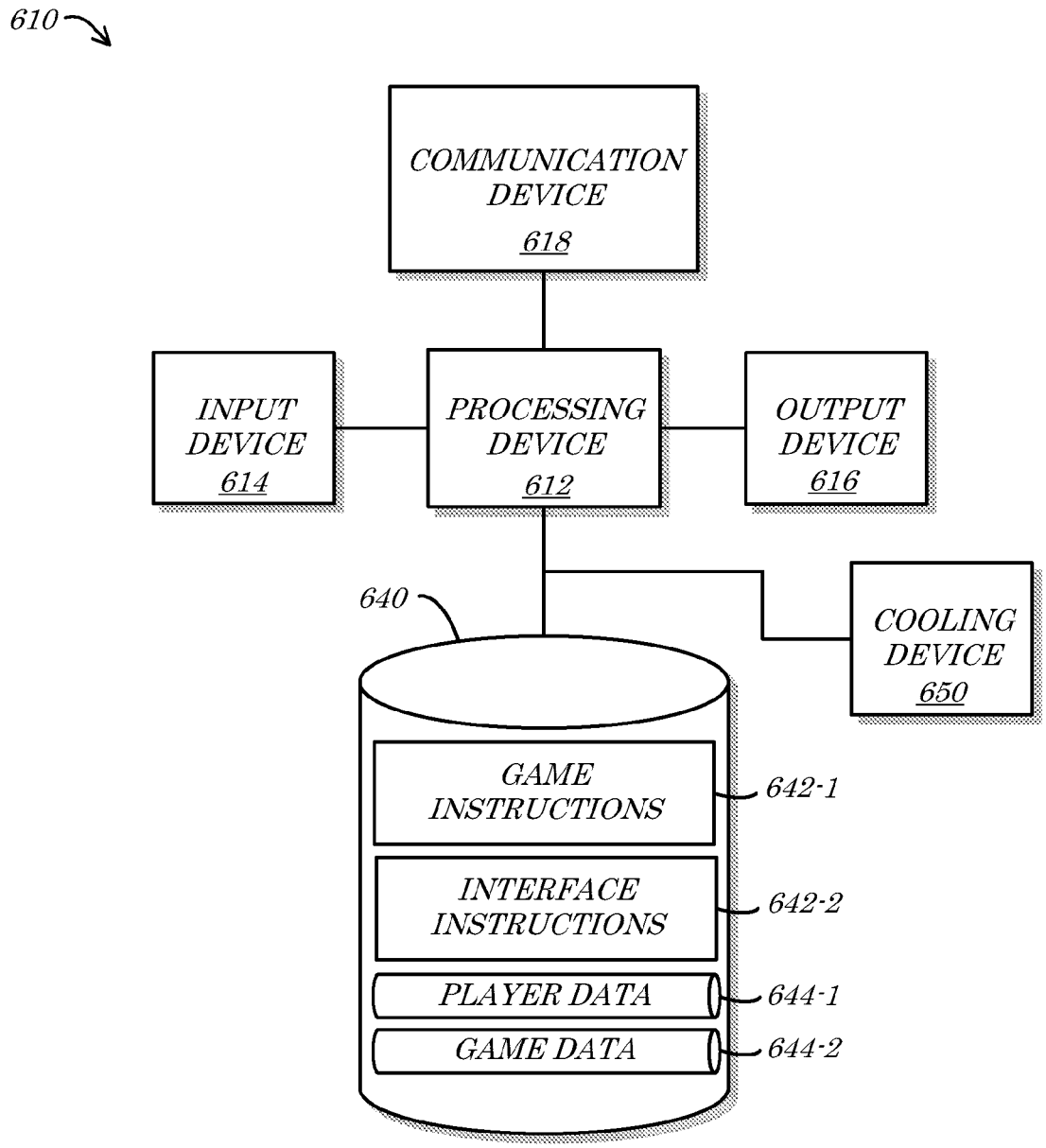
FIG. 6 is a block diagram of an apparatus according to one or more embodiments.
Figure 7A:
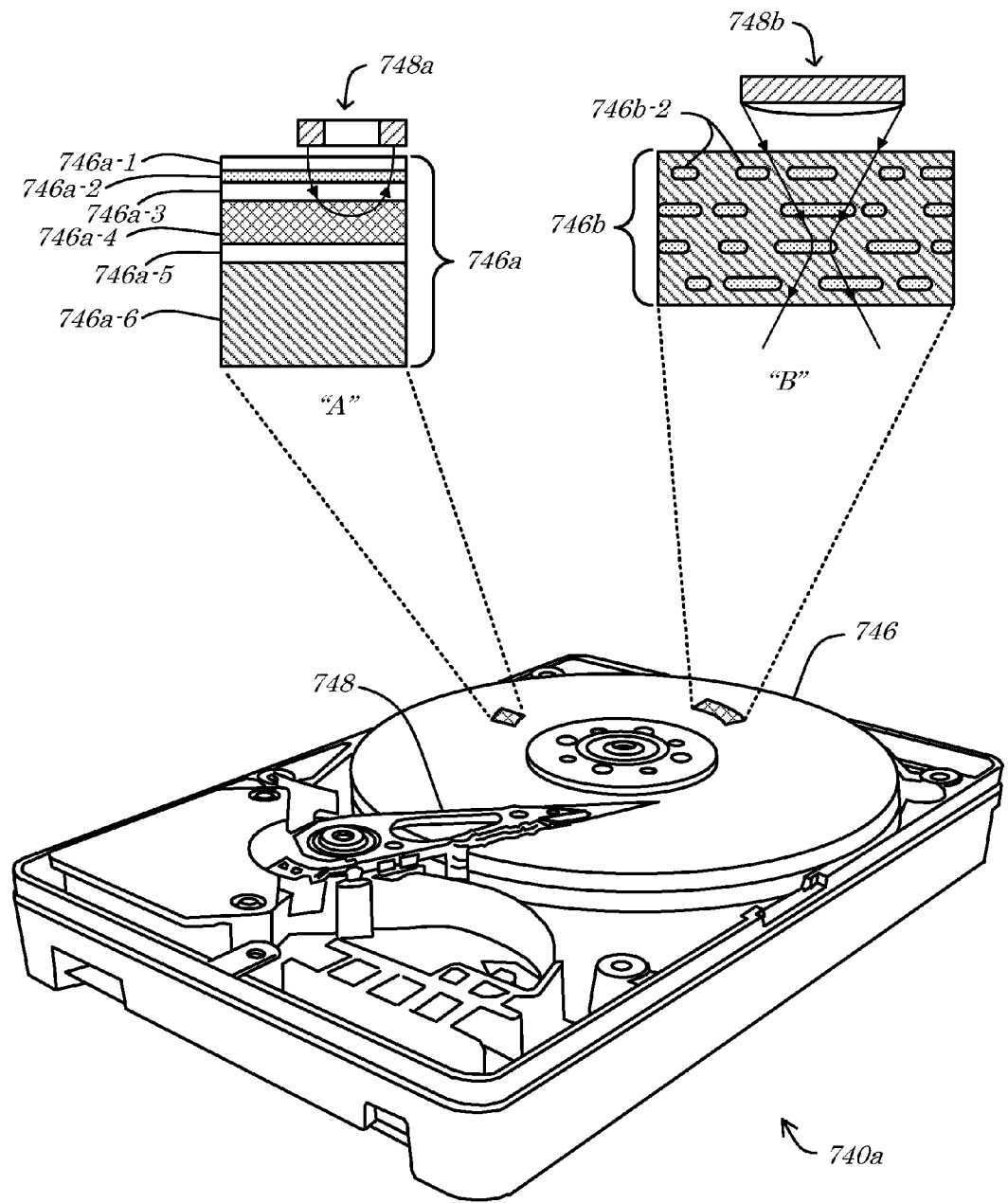
FIG. 7A, FIG. 7B, FIG. 7C, FIG. 7D, and FIG. 7E are perspective diagrams of exemplary data storage devices according to one or more embodiments.
Figure 7B:
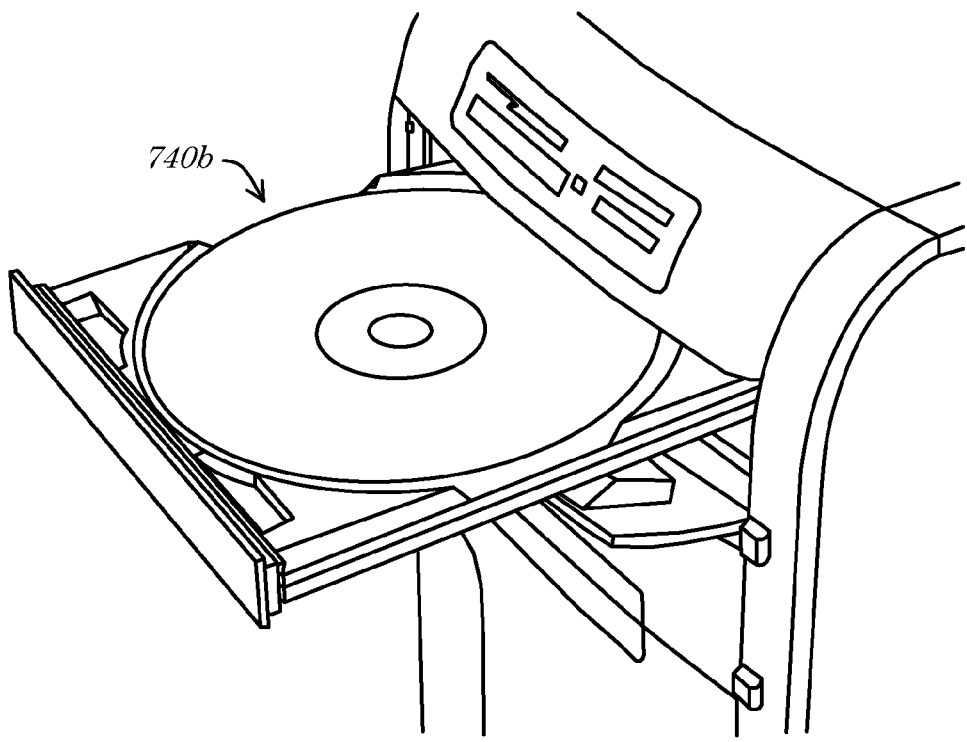
Figure 7C:
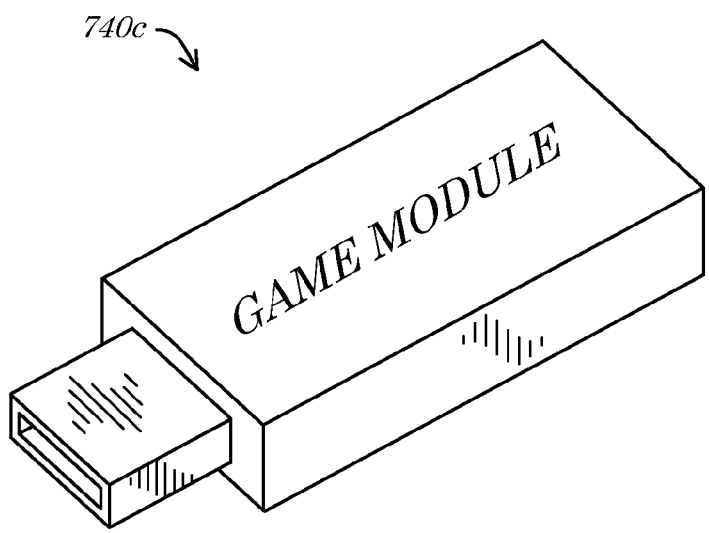
Figure 7D:
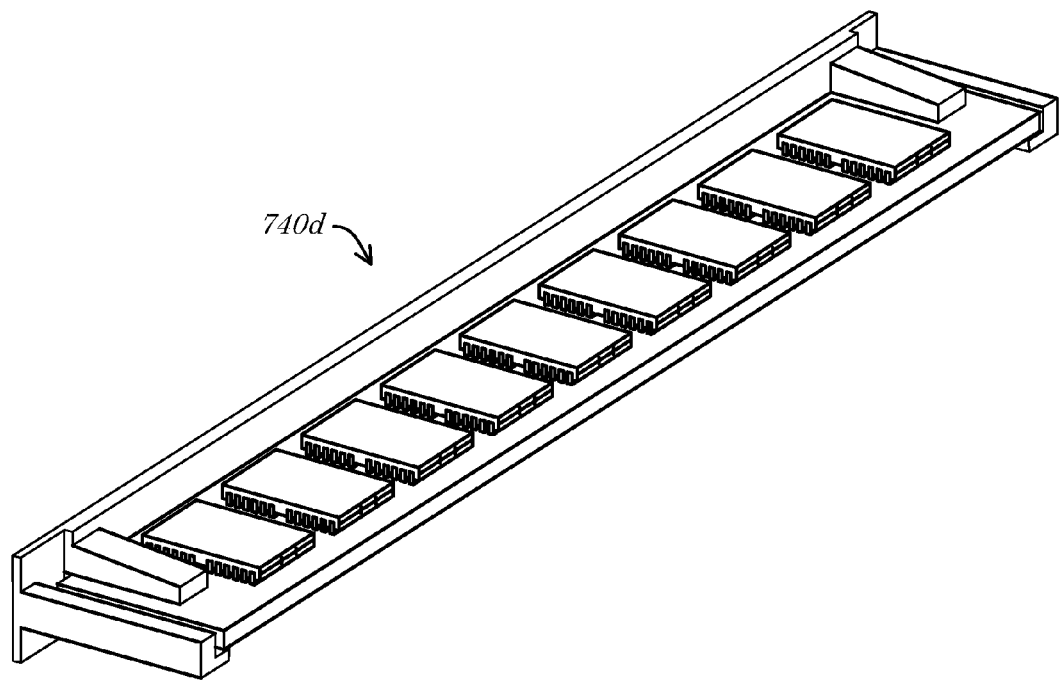
Figure 7E:
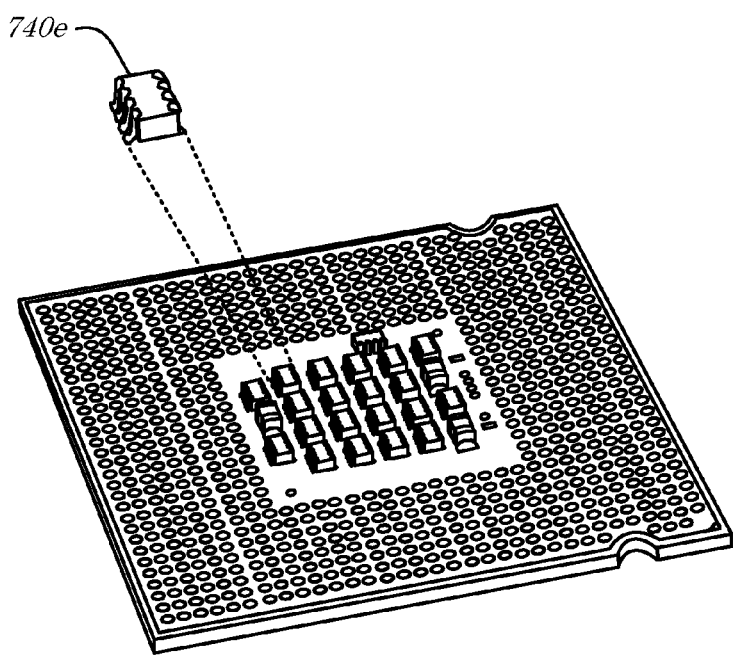

Turning to FIG. 6, a block diagram of an apparatus 600 according to some embodiments is shown. In some embodiments, the apparatus 600 may be similar in configuration and/or functionality to any of the player and/or user devices 102a-n, 202a-n, 302a-b, 402, 502 and/or the servers and/or controller devices 110, 210a-n, 310a-g, 410e-f, 510a-j of FIG. 1, FIG. 2, FIG. 3, FIG. 4, and/or FIG. 5 in this disclosure, and/or may otherwise comprise a portion of the systems 100, 200, 300, 400, 500 of FIG. 1, FIG. 2, FIG. 3, FIG. 4, and/or FIG. 5 in this disclosure. The apparatus 600 may, for example, execute, process, facilitate, and/or otherwise be associated with the methods 800 (FIG. 8), 900 (FIG. 9) and/or 1000 (FIG. 1000) described in this disclosure. In some embodiments, the apparatus 600 may comprise a processing device 612, an input device 614, an output device 616, a communication device 618, a memory device 640, and/or a cooling device 650. According to some embodiments, any or all of the components 612, 614, 616, 618, 640, 650 of the apparatus 600 may be similar in configuration and/or functionality to any similarly named and/or numbered components described in this disclosure. Fewer or more components 612, 614, 616, 618, 640, 650 and/or various configurations of the components 612, 614, 616, 618, 640, 650 may be included in the apparatus 600 without deviating from the scope of embodiments described in this disclosure.

According to some embodiments, the processing device 612 may be or include any type, quantity, and/or configuration of electronic and/or computerized processor that is or becomes known. The processing device 612 may comprise, for example, an Intel® IXP 2800 network processor or an Intel® XEON™ Processor coupled with an Intel® E7501 chipset. In some embodiments, the processing device 612 may comprise multiple inter-connected processors, microprocessors, and/or micro-engines. According to some embodiments, the processing device 612 (and/or the apparatus 600 and/or portions thereof) may be supplied power via a power supply (not shown) such as a battery, an Alternating Current (AC) source, a Direct Current (DC) source, an AC/DC adapter, solar cells, and/or an inertial generator. In the case that the apparatus 600 comprises a server such as a blade server, necessary power may be supplied via a standard AC outlet, power strip, surge protector, a PDU, and/or Uninterruptible Power Supply (UPS) device.

In some embodiments, the input device 614 and/or the output device 616 are communicatively coupled to the processing device 612 (e.g., via wired and/or wireless connections and/or pathways) and they may generally comprise any types or configurations of input and output components and/or devices that are or become known, respectively. The input device 614 may comprise, for example, a keyboard that allows an operator of the apparatus 600 to interface with the apparatus 600 (e.g., by a player, such as to participate in an online game session as described in this disclosure). In some embodiments, the input device 614 may comprise a sensor configured to provide information such as player relationships to the apparatus 600 and/or the processing device 612. The output device 616 may, according to some embodiments, comprise a display screen and/or other practicable output component and/or device. The output device 616 may, for example, provide a game interface (not explicitly shown in FIG. 6) to a player (e.g., via a website). According to some embodiments, the input device 614 and/or the output device 616 may comprise and/or be embodied in a single device such as a touch-screen monitor.

In some embodiments, the communication device 618 may comprise any type or configuration of communication device that is or becomes known or practicable. The communication device 618 may, for example, comprise a network interface card (NIC), a telephonic device, a cellular network device, a router, a hub, a modem, and/or a communications port or cable. In some embodiments, the communication device 618 may be coupled to provide data to a player device (not shown in FIG. 6), such as in the case that the apparatus 600 is utilized to provide a game interface to a player as described in this disclosure. The communication device 618 may, for example, comprise a cellular telephone network transmission device that sends signals indicative of game interface components to customer and/or subscriber handheld, mobile, and/or telephone device. According to some embodiments, the communication device 618 may also or alternatively be coupled to the processing device 612. In some embodiments, the communication device 618 may comprise an IR, RF, Bluetooth™, and/or Wi-Fi® network device coupled to facilitate communications between the processing device 612 and another device (such as a player device and/or a third-party device).

The memory device 640 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 640 may, according to some embodiments, store one or more of game instructions 642-1 and/or interface instructions 642-2. In some embodiments, the game instructions 642-1 and/or the interface instructions 642-2 may be utilized by the processing device 612 to provide output information via the output device 616 and/or the communication device 618.

According to some embodiments, the game instructions 642-1 may be operable to cause the processing device 612 to process player data 644-1 and/or game data 644-2. Player data 644-1 and/or game data 644-2 received via the input device 614 and/or the communication device 618 may, for example, be analyzed, sorted, filtered, decoded, decompressed, ranked, scored, plotted, and/or otherwise processed by the processing device 612 in accordance with the game instructions 642-1.

In some embodiments, the interface instructions 642-2 may be operable to cause the processing device 612 to process player data 644-1 and/or game data 644-2. Player data 644-1 and/or game data 644-2 received via the input device 614 and/or the communication device 618 may, for example, be analyzed, sorted, filtered, decoded, decompressed, ranked, scored, plotted, and/or otherwise processed by the processing device 612 in accordance with the interface instructions 642-2. In some embodiments, player data 644-1 and/or game data 644-2 may be fed by the processing device 612 through one or more mathematical and/or statistical formulas and/or models in accordance with the interface instructions 642-2 to provide one or more game interfaces in accordance with embodiments described in this disclosure (e.g., displaying or otherwise transmitting information about one or more lucky bingo symbols, called bingo numbers, and/or winning combinations of bingo symbols).

Any or all of the exemplary instructions and data types described in this disclosure and other practicable types of data may be stored in any number, type, and/or configuration of memory devices that is or becomes known. The memory device 640 may, for example, comprise one or more data tables or files, databases, table spaces, registers, and/or other storage structures. In some embodiments, multiple databases and/or storage structures (and/or multiple memory devices 640) may be utilized to store information associated with the apparatus 600. According to some embodiments, the memory device 640 may be incorporated into and/or otherwise coupled to the apparatus 600 (e.g., as shown) or may simply be accessible to the apparatus 600 (e.g., externally located and/or situated).

In some embodiments, the apparatus 600 may comprise a cooling device 650. According to some embodiments, the cooling device 650 may be coupled (physically, thermally, and/or electrically) to the processing device 612 and/or to the memory device 640. The cooling device 650 may, for example, comprise a fan, heat sink, heat pipe, radiator, cold plate, and/or other cooling component or device or combinations thereof, configured to remove heat from portions or components of the apparatus 600.

Referring to FIG. 7A, FIG. 7B, FIG. 7C, FIG. 7D, and FIG. 7E, perspective diagrams of exemplary data storage devices 740*a-e* according to some embodiments are shown. The data storage devices 740*a-d* may, for example, be utilized to store instructions and/or data such as the game instructions 642-1 and/or interface instructions 642-2, each of which is described in reference to FIG. 6 in this disclosure. In some embodiments, instructions stored on the data storage devices 740*a-d* may, when executed by a processor (such as the processor device 612 of FIG. 6), cause the implementation of and/or facilitate the method 800, and/or portions or combinations thereof, as described in this disclosure.

According to some embodiments, the first data storage device 740a may comprise one or more various types of internal and/or external hard drives. The first data storage device 740a may, for example, comprise a data storage medium 746 that is read, interrogated, and/or otherwise communicatively coupled to and/or via a disk reading device 748. In some embodiments, the first data storage device 740a and/or the data storage medium 746 may be configured to store information utilizing one or more magnetic, inductive, and/or optical means (e.g., magnetic, inductive, and/or optical-encoding). The data storage medium 746, depicted as a first data storage medium 746a for example (e.g., breakout cross-section "A"), may comprise one or more of a polymer layer 746a-1, a magnetic data storage layer 746a-2, a non-magnetic layer 746a-3, a magnetic base layer 746a-4, a contact layer 746a-5, and/or a substrate layer 746a-6. According to some embodiments, a magnetic read head 746a may be coupled and/or disposed to read data from the magnetic data storage layer 746a-2.

In some embodiments, the data storage medium 746, depicted as a second data storage medium 746b for example (e.g., breakout cross-section "B"), may comprise a plurality of data points 746b-2 disposed with the second data storage medium 746b. The data points 746b-2 may, in some embodiments, be read and/or otherwise interfaced with via a laser-enabled read head 748b disposed and/or coupled to direct a laser beam through the second data storage medium 746b.

In some embodiments, the second data storage device 740b may comprise a CD, CD-ROM, DVD, Blu-Ray™ Disc, and/or other type of optically-encoded disk and/or other storage medium that is or becomes know or practicable. In some embodiments, the third data storage device 740c may comprise a USB keyfob, dongle, and/or other type of flash memory data storage device that is or becomes know or practicable. In some embodiments, the fourth data storage device 740d may comprise RAM of any type, quantity, and/or configuration that is or becomes practicable and/or desirable. In some embodiments, the fourth data storage device 740d may comprise an off-chip cache such as a Level 2 (L2) cache memory device. According to some embodiments, the fifth data storage device 740e may comprise an on-chip memory device such as a Level 1 (L1) cache memory device.

The data storage devices 740a-e may generally store program instructions, code, and/or modules that, when executed by a processing device cause a particular machine to function in accordance with one or more embodiments described in this disclosure. The data storage devices 740a-e depicted in FIG. 7A, FIG. 7B, FIG. 7C, FIG. 7D, and FIG. 7E are representative of a class and/or subset of computer-readable media that are defined in this disclosure as "computer-readable memory" (e.g., non-transitory memory devices as opposed to transmission devices or media).

The terms "computer-readable medium" and "computer-readable memory" refer to any medium that participates in providing data (e.g., instructions) that may be read by a computer and/or a processor. Such a medium may take many forms, including but not limited to non-volatile media, volatile media, and other specific types of transmission media. Non-volatile media include, for example, optical or magnetic disks and other persistent memory. Volatile media include DRAM, which typically constitutes the main memory. Other types of transmission media include coaxial cables, copper wire, and fiber optics, including the wires that comprise a system bus coupled to the processor.

Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable medium" and/or "tangible media" specifically exclude signals, waves, and wave forms or other intangible or transitory media that may nevertheless be readable by a computer.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined above and includes many exemplary protocols that are also applicable in this disclosure.

In some embodiments, one or more specialized machines such as a computerized processing device, a server, a remote terminal, and/or a customer device may implement the various practices described in this disclosure. A computer system of a gaming entity may, for example, comprise various specialized computers that interact to provide for online games as described in this disclosure.

D. Processes

According to some embodiments, processes described in this disclosure may be performed and/or implemented by and/or otherwise associated with one or more specialized and/or computerized processing devices (e.g., the player and/or user devices 102a-n, 202a-n, 302a-b, 402, 502 and/or the servers and/or controller devices 110, 210a-n, 310a-g, 410e-f, 510a-j of FIG. 1, FIG. 2, FIG. 3, FIG. 4, and/or FIG. 5 in this disclosure), specialized computers, computer terminals, computer servers, computer systems and/or networks, and/or any combinations thereof (e.g., by one or more online game providers and/or online gaming player processing devices). In some embodiments, methods may be embodied in, facilitated by, and/or otherwise associated with various input mechanisms and/or interfaces.

Any processes described in this disclosure do not necessarily imply a fixed order to any depicted actions, steps, and/or procedures, and embodiments may generally be performed in any order that is practicable unless otherwise and specifically noted. Any of the processes and/or methods described in this disclosure may be performed and/or facilitated by hardware, software (including microcode), firmware, or any combination thereof. For example, a storage medium (e.g., a hard disk, Universal Serial Bus (USB) mass storage device, and/or Digital Video Disk (DVD)) may store thereon instructions that when executed by a machine (such as a computerized processing device) result in performance according to any one or more of the embodiments described in this disclosure.

Figure 8:
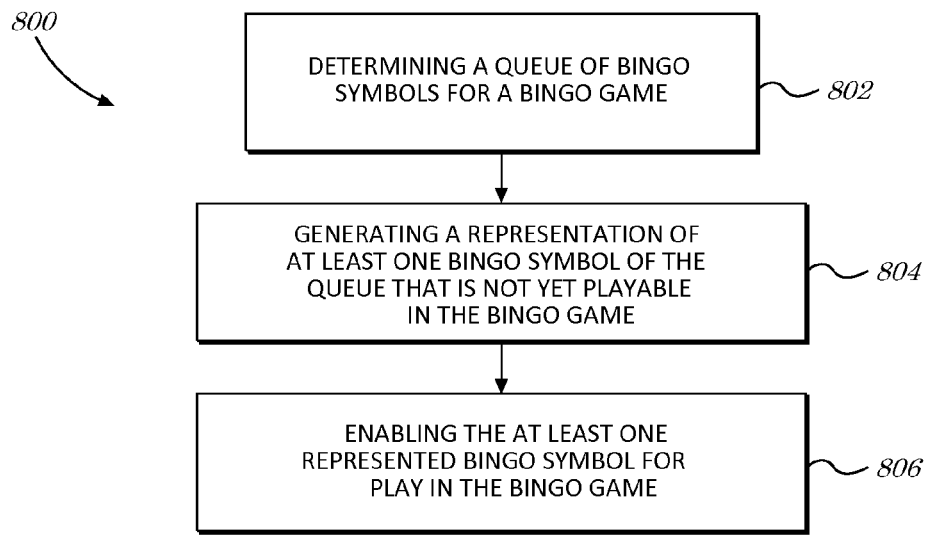
FIG. 8 is a flowchart of a method according to one or more embodiments.

Referring now to FIG. 8, a flow diagram of a method 800 according to some embodiments is shown. The method 800 may be performed, for example, by a server computer (e.g., a game server). It should be noted that although some of the steps of method 800 may be described as being performed by a server computer while other steps are described as being performed by another computing device, any and all of the steps may be performed by a single computing device which may be a mobile device, desktop computer, or another computing device. Further any steps described herein as being performed by a particular computing device may, in some embodiments, be performed by a human or another computing device as appropriate.

According to some embodiments, the method 800 may comprise determining a queue of bingo symbols for a bingo game, at 802. In one example, determining a queue of bingo symbols for a bingo game may comprise determining a sequence of bingo symbols (e.g., bingo balls) by drawing symbols one by one in accordance with any of various well known means for determining bingo draws. In one embodiment, determining a queue of bingo symbols may comprise storing (e.g., in a database) an indication of a sequence of two or more bingo numbers called, or to be called, in a bingo game. Upon initiating a game session, the stored sequence may be accessed in order to determine which bingo number to call next in the game and/or to determine an order of bingo balls to represent in a visible ball queue. In one or more embodiments, determining a queue of bingo symbols may be performed prior to the beginning of a bingo game session and/or prior to purchase of one or more bingo cards According to some embodiments, the method 800 may further comprise generating a representation of at least one bingo symbol of the queue that is not yet playable in the bingo game, at 804. In one or more embodiments, generating a representation of at least one bingo symbol of the queue that is not yet playable in the bingo game may comprise displaying, via a user interface, a representation of the at least one bingo symbol in an ordered queue of symbols not yet called for play or otherwise enabled for play in the bingo game. In one example, wherein an order in which at least two bingo balls are to be called has previously been determined (e.g., as drawn by a game server), generating a representation may comprise displaying a sequence of a first bingo ball, followed by a second bingo ball that will be called after the first bingo ball.

According to some embodiments, the method 800 may comprise enabling the at least one represented bingo symbol for play in the bingo game, at 806. In one embodiment, enabling the at least one represented bingo symbol for play may comprise calling the bingo symbol. In some embodiments, enabling a bingo symbol that is not yet playable, for play in the bingo game, may comprise changing a status of the bingo symbol. For example, changing the status may comprise changing a status indication in a database or other data storage, from a value that indicates a bingo ball has not been called to a value that indicates the bingo ball is or has been called. In some embodiments, enabling the at least one represented bingo symbol for play may comprise removing a bingo symbol from a first location of a user interface for the bingo game (e.g., a visible ball queue) and/or representing the bingo symbol at a second location for the bingo game (e.g., a called ball location, call history location). In some embodiments, enabling the at least one represented bingo symbol for play may comprise advancing the at least one bingo symbol out of a queue of balls to be called or enabled for play.

Figure 9:
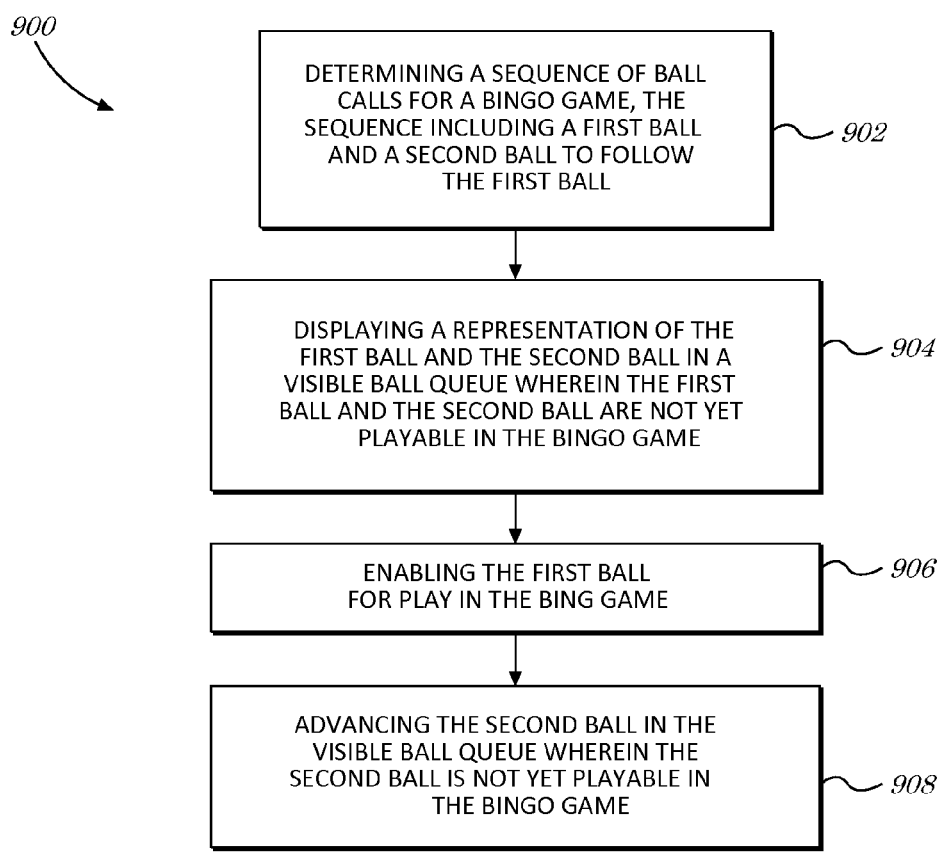
FIG. 9 is a flowchart of a method according to one or more embodiments.

Referring now to FIG. 9, a flow diagram of a method 900 according to some embodiments is shown. The method 900 may be performed, for example, by a server computer (e.g., a game server). It should be noted that although some of the steps of method 900 may be described as being performed by a server computer while other steps are described as being performed by another computing device, any and all of the steps may be performed by a single computing device which may be a mobile device, desktop computer, or another computing device. Further any steps described herein as being performed by a particular computing device may, in some embodiments, be performed by a human or another computing device as appropriate.

According to some embodiments, the method 900 may comprise determining a sequence of ball calls for a bingo game, the sequence including a first ball and a second ball to follow the first ball, at 902. In one embodiment, determining the sequence comprises drawing a series of numbered bingo balls (e.g., by a bingo game server) to determine the order in which numbered bingo balls will be called in a bingo game. Determining the sequence may comprise selecting, from an initial set of available numbered bingo balls, a first bingo ball to be called first, a second bingo ball to be called second, and so on, and storing an indication of the sequence of numbered ball (e.g., for use in later providing a bingo game). In one embodiment, each ball call may be determined (e.g., drawn) and then called before the next is determined. In another embodiment, two or more ball calls are determined before being called. In one example, the sequence of all ball calls is determined before any bingo ball is called for play in the bingo game.

According to some embodiments, the method 900 may comprise displaying a representation of the first ball and the second ball in a visible ball queue, wherein the first ball and the second ball are not yet playable in the bingo game, at 904. In one example, the visible ball queue provides a representation of the first ball and the second ball in the order in which they will be called, but because the balls are not yet playable, any bingo spaces (e.g., on a bingo card presented via a user interface) corresponding to the first and second balls (if present) cannot be daubed by a player and/or are not daubed automatically while the balls are in the queue.

According to some embodiments, the method 900 may comprise enabling the first ball for play in the bingo game, at 906. In one embodiment, enabling the first ball for play comprises calling the first ball and/or changing a status of the first ball to allow any corresponding spot on a bingo card (or other representation of a player's bingo symbols) to be daubed (e.g., by a player and/or automatically). In some embodiments, enabling the first ball for play may comprise displaying a representation of the first ball as being enabled for play (e.g., by distinguishing the first ball visually from any other balls not yet playable in the bingo game). In one embodiment, enabling the first ball for play may comprise removing the first ball from the visible ball queue.

According to some embodiments, the method 900 may comprise advancing the second ball in the visible ball queue wherein the second ball is not yet playable in the bingo game, at 908. For example, the first ball may be advanced out of a queue (e.g., to a called ball location), in accordance with some embodiments, while the second ball is advanced in the queue but not yet out of the queue.

Figure 10:
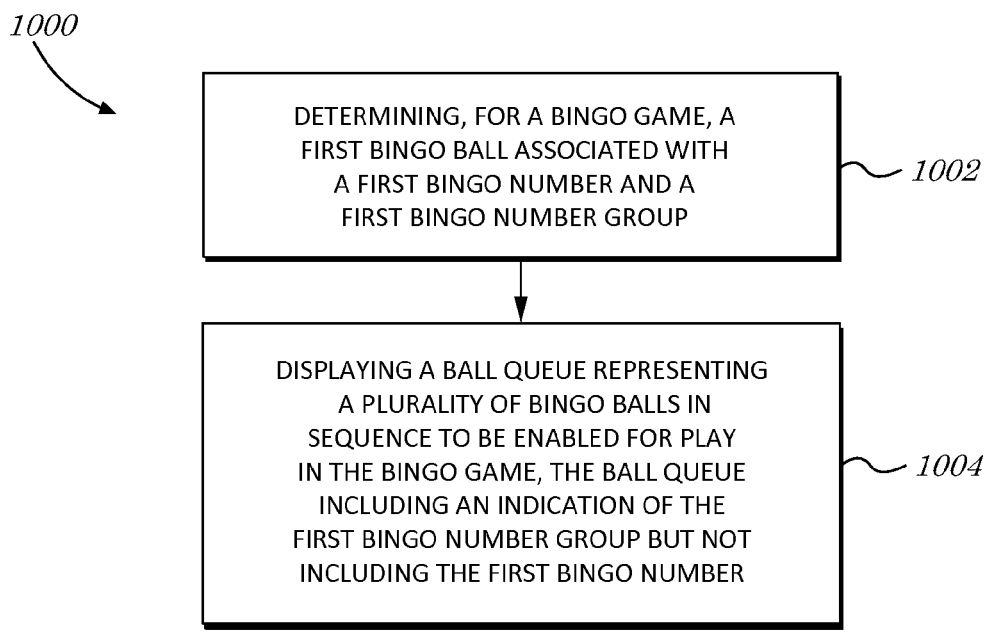
FIG. 10 is a flowchart of a method according to one or more embodiments.

Referring now to FIG. 10, a flow diagram of a method 1000 according to some embodiments is shown. The method 1000 may be performed, for example, by a server computer (e.g., a game server). It should be noted that although some of the steps of method 1000 may be described as being performed by a server computer while other steps are described as being performed by another computing device, any and all of the steps may be performed by a single computing device which may be a mobile device, desktop computer, or another computing device. Further any steps described herein as being performed by a particular computing device may, in some embodiments, be performed by a human or another computing device as appropriate.

According to some embodiments, the method 1000 may comprise determining, for a bingo game, a first bingo ball associated with a first bingo number and a first bingo number group, at 1002. In accordance with some embodiments, the method 1000 may further comprise displaying a ball queue representing a plurality of bingo balls in sequenced to be enabled for play in the bingo game, the ball queue including an indication of the first bingo number group but not including the first bingo number, at 1004. According to one or more embodiments, a first numbered bingo ball (e.g., "63") may be determined (e.g., by a bingo game server). In a typical 75 ball bingo game using a 5×5 bingo card array, each bingo number is associated with a particular column of the bingo card (e.g., "63" is associated with the "O" column). Accordingly, each numbered bingo ball is associated with a column identifier. Displaying the ball queue may comprise displaying, in the ball queue, a representation of the column identifier (e.g., "O") of the first ball in the queue, without indicating the actual bingo ball number (e.g., "63"). Accordingly, in some embodiments, a player may be given partial information about an upcoming ball call (e.g., only a location identifier but not a bingo number). In some embodiments, the first bingo number may be revealed when the first bingo ball is called or enabled for play.

E. Example Interfaces and Applications

Any or all of methods 800, 900, 1000, and/or other methods described in this disclosure, may involve one or more interfaces. One or more of such methods may include, in some embodiments, providing an interface by and/or through which a user may play a bingo game. Although certain types of information are illustrated in the example interfaces, those skilled in the art will understand that the interfaces may be modified in order to provide for additional types of information and/or to remove some of the illustrated types of information, as deemed desirable for a particular implementation.

Figure 11A:
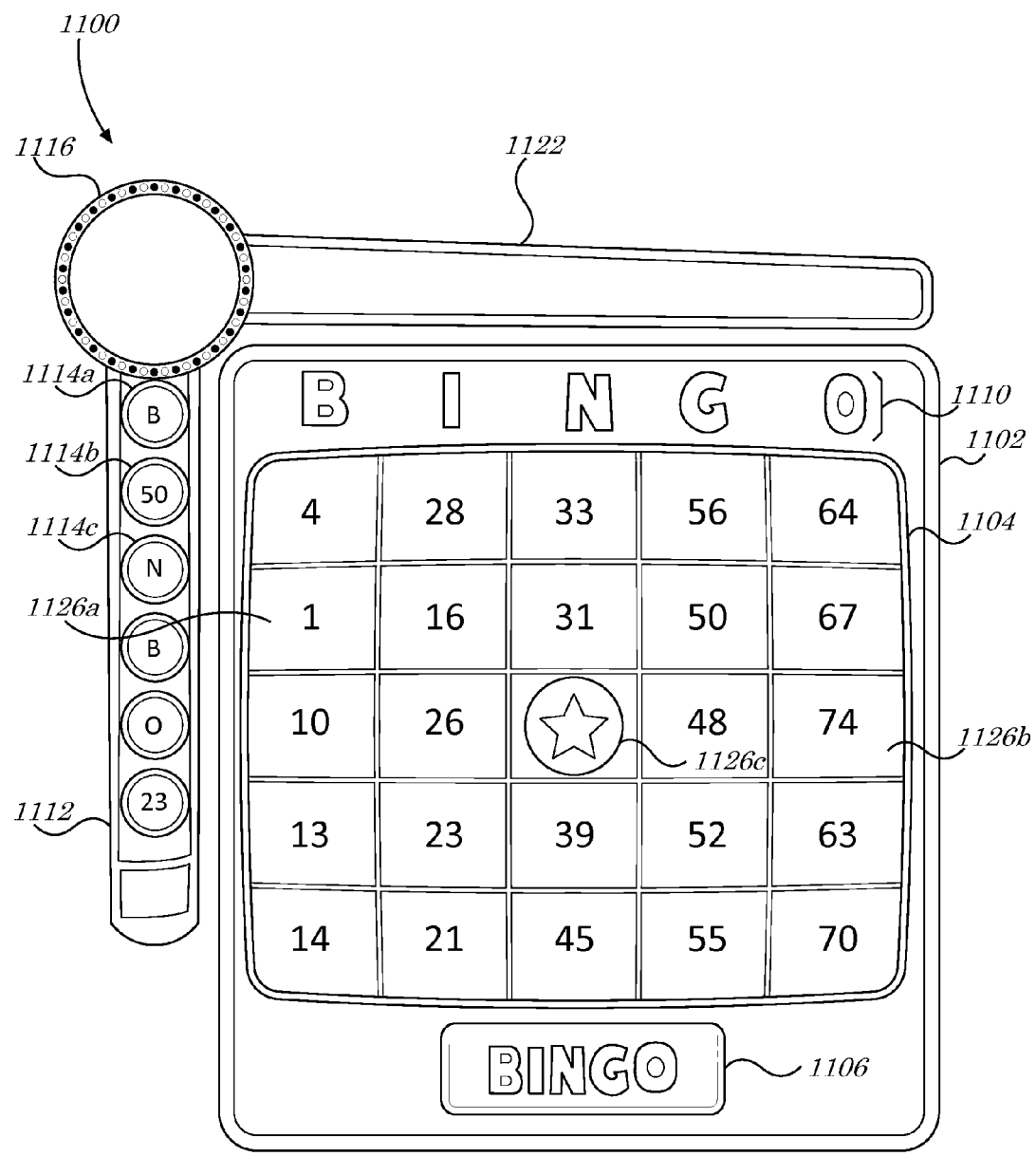
FIG. 11A, FIG. 11B, FIG. 11C, and FIG. 11D depict example user interfaces according to one or more embodiments.

FIGS. 11A-11D depict an example of play of a bingo game as presented via an example interface 1100 for a game application providing for play of a bingo game (e.g., an online bingo game or a social network game played over the Internet), in accordance with one or more embodiments discussed in this disclosure. FIG. 11A illustrates the example interface 1100 presenting a start of a bingo game (e.g., before any bingo balls have been called or enabled for play). The example interface 1100, as depicted, includes a bingo card area 1102. The example bingo card area 1102 includes at least one bingo card 1104 including a plurality of player bingo spaces 1126a, 1126b, 1126c, for playing a bingo game. In the example interface illustrated in FIG. 11A, player bingo space 1126c is already marked (e.g., it is a free space in the bingo game). Each of the other player bingo spaces of the example 5×5 array is associated with an indicated bingo number. Bingo card area 1102 also includes a plurality of location identifiers 1110 ("B", "I", "N", "G", "O"), each associated with a respective column of the bingo card 1104. A bingo button 1106 may be configured, for example, to allow a player to indicate that the player has earned a "Bingo" in the bingo game (e.g., by meeting a predetermined winning bingo pattern). As depicted in FIG. 11A, no information is provided in ball call area 1116 or called ball history area 1122 because at this point in the example game play, no ball has yet been called for the bingo game.

In addition to the represented bingo card area 1102, the example interface 1100 also displays a representation of a ball queue 1112 (e.g., a visible ball queue), ball call area 1116, and called ball history area 1122. In accordance with some embodiments, as discussed in this disclosure, ball queue 1112 includes one or more representations of bingo balls 1114a, 1114b, 1114c that represent bingo balls that have been drawn for play of the bingo game. As depicted in the ball queue 1112, the bingo balls represented are displayed in the order in which they will be called in the bingo game: bingo ball 1114a will be called first, then bingo ball 1114b will be called, then bingo ball 1114c, and so on.

As depicted in example ball queue 1112, only the location identifiers "B" and "N" associated with bingo balls 1114a and 1114c, respectively, are displayed. Any bingo number or other symbol identifier associated with those bingo balls (which may have been determined prior to the start of play) is not displayed for those bingo balls in the ball queue 1112. Accordingly, a player playing the bingo game may be able to anticipate based on the displayed information that he may have a potential match in the "B" or "N" column, but he cannot be certain because the ball's bingo numbers are not yet displayed.

Figure 11B:
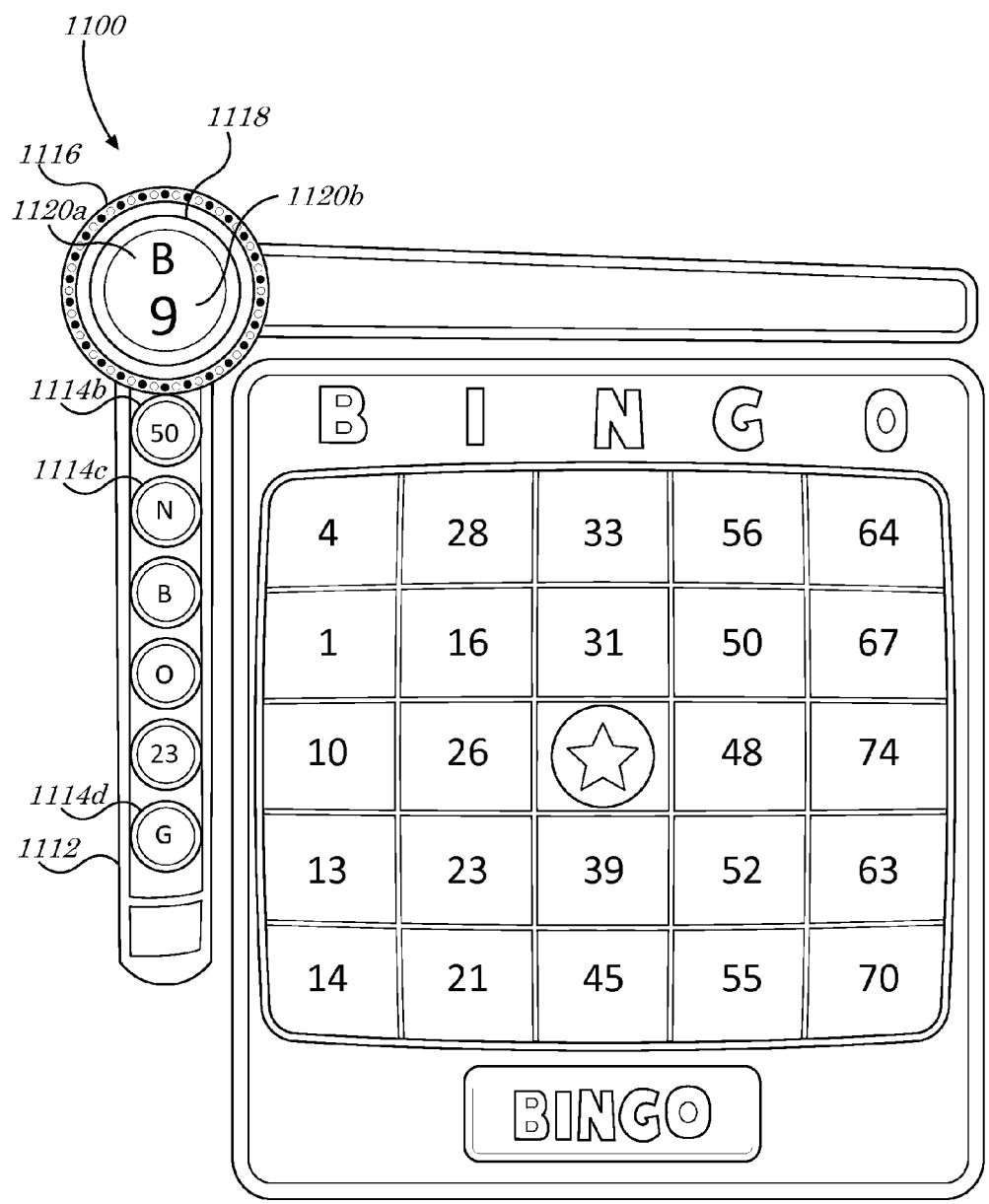

FIG. 11B illustrates another example of interface 1100, after or upon the first bingo ball (represented as 1114a in FIG. 11A) being called or otherwise enabled for play in the bingo game. As depicted in FIG. 11B, ball call area 1116 now provides a representation of a called ball 1118, the representation including an indication of a location identifier 1120a ("B") and bingo ball number 1120b ("9"). In accordance with one or more embodiments, FIG. 11B thus illustrates an example of play of a game in which a ball is called and/or advanced out of a visible ball queue after first being represented in a ball queue that represents a sequence of bingo balls drawn for play but not yet enabled for play. In one embodiment, the appearance of the called ball 1118 in ball call area 1116 means that the interface 1100 may now be enabled to allow a player to daub a bingo space that matches bingo ball number 1120b (e.g., using a pointer device or other type of input device). In some embodiments, any represented bingo balls indicated in ball queue 1112 may not be daubed or marked until called or represented in ball call area 1116 (even if a bingo ball matches a player bingo number).

As depicted in FIG. 11B, with called ball 1118 moving out of the ball queue 1112, the other balls in the ball queue 1112 (including bingo balls 1114b, 1114c) are represented as having advanced (e.g., moved upward) in the ball queue. In accordance with some embodiments, a new bingo ball 1114d is now represented at the bottom ball queue 1112. As discussed in this disclosure, the bingo ball represented by bingo ball 1114d may have been predetermined with a sequence of drawn bingo balls, and a game server may determine (e.g., by querying a database of drawn balls associated with this bingo game sessions) that bingo ball 1114d is the next bingo ball to move into the ball queue.

Figure 11C:
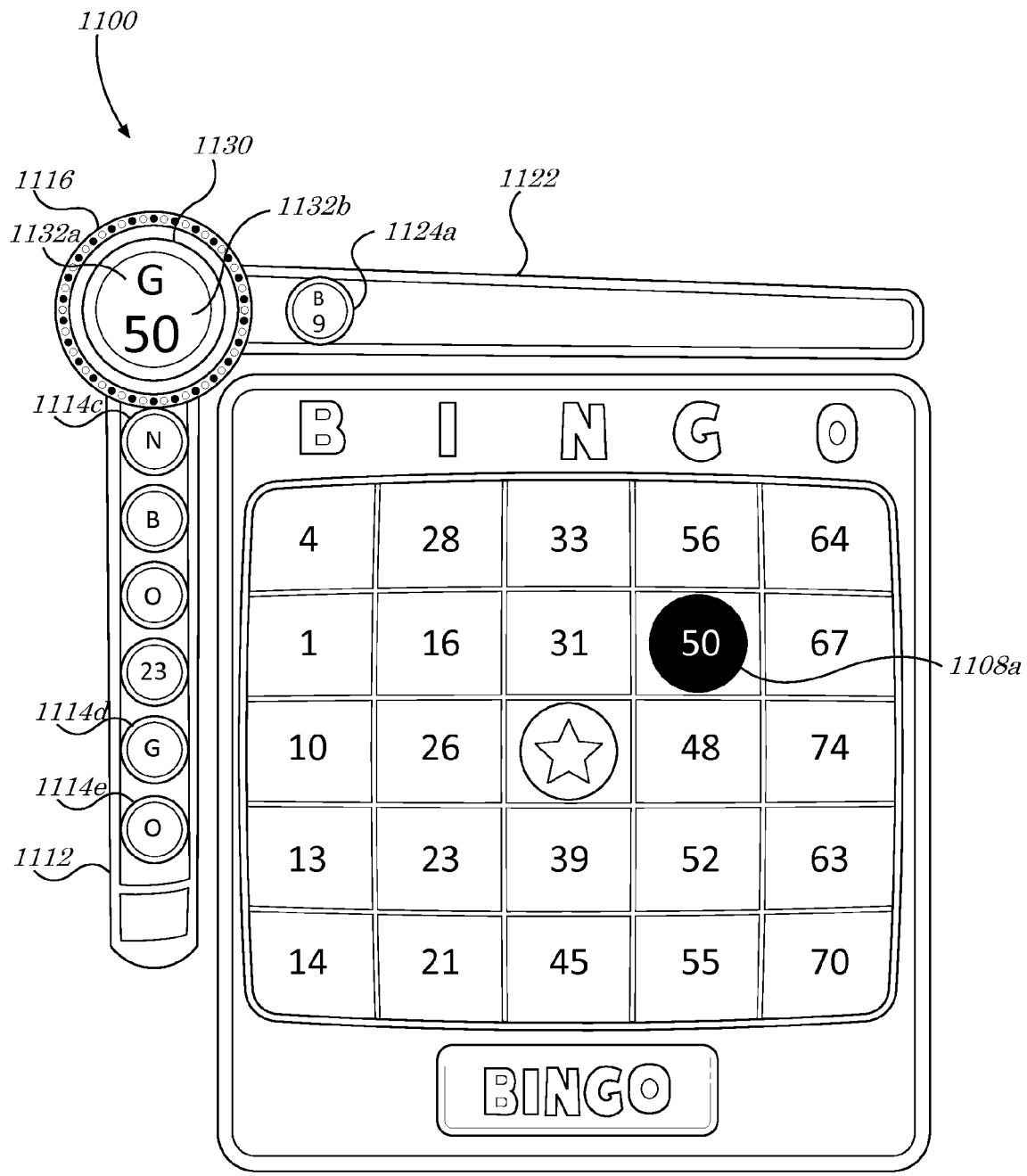

FIG. 11C illustrates another example of interface 1100, after or upon the next bingo ball (represented as 1114b in FIG. 11B) being called or otherwise enabled for play in the bingo game. As depicted in FIG. 11C, ball call area 1116 now provides a representation of a called ball 1130, the representation including an indication of a location identifier 1132a ("G") and bingo ball number 1132b ("50"). As depicted in the example interface 1100, the player bingo space 1108a corresponding to the called ball 1130 in ball call area 1116 is represented as having been daubed (e.g., by a player or automatically) because the number at the player bingo space matches the called ball. In accordance with one or more embodiments, FIG. 11C thus illustrates an example of play of a game in which a ball is called and/or advanced out of a visible ball queue after first being represented in a ball queue but not yet enabled for play. In this example, the corresponding number ("50") of the ball was known while the ball was in the ball queue 1112.

As depicted in FIG. 11C, with called ball 1130 having moved out of the ball queue 1112, the other balls in the ball queue 1112 (including bingo balls 1114c, 1114d) are represented as having advanced (e.g., moved upward) in the ball queue. In accordance with some embodiments, a new bingo ball 1114e is now represented at the bottom ball queue 1112.

As depicted in FIG. 11C, the previous called ball 1118 (from FIG. 11B) is now represented as previously called ball 1124a in called ball history area 1122. In some embodiments, a player may be allowed to mark any balls represented in ball call area 1116 or called ball history area 1122. In one embodiment, previously called balls may be removed from called ball history area 1122 after a period of time and/or after a predetermined number of balls have been called.

Figure 11D:
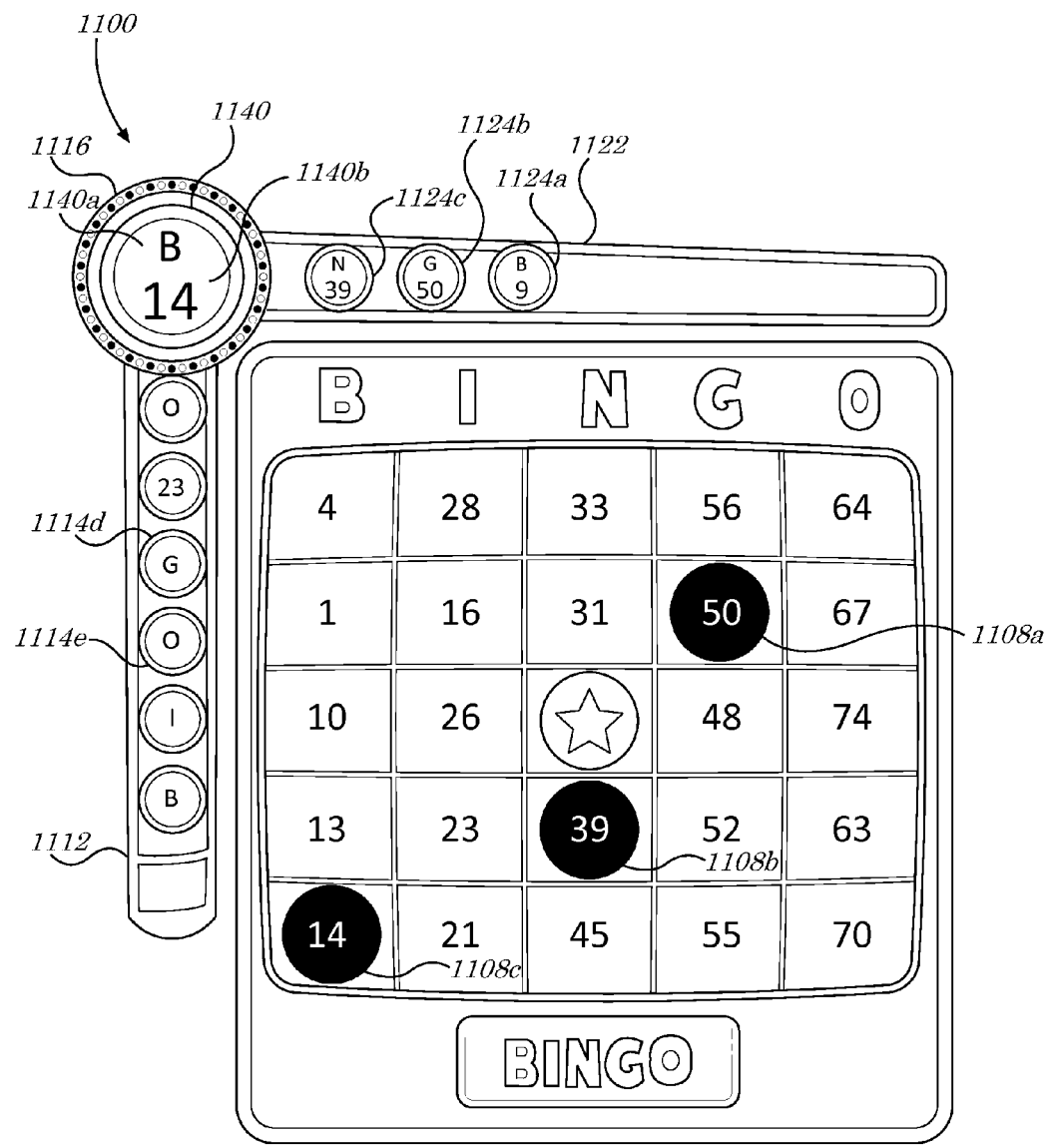

FIG. 11D illustrates another example of interface 1100, in which ball call area 1116 now provides a representation of a called ball 1140, the representation including an indication of a location identifier 1142a ("B") and bingo ball number 1142b ("14"). As depicted in the example interface 1100 of FIG. 11D, the daubed player bingo space 1108b corresponds to previously called ball 1124c in called ball history area 1122, and the daubed player bingo space 1108c corresponds to the called ball 1140 in ball call area 1116.

Figure 12:
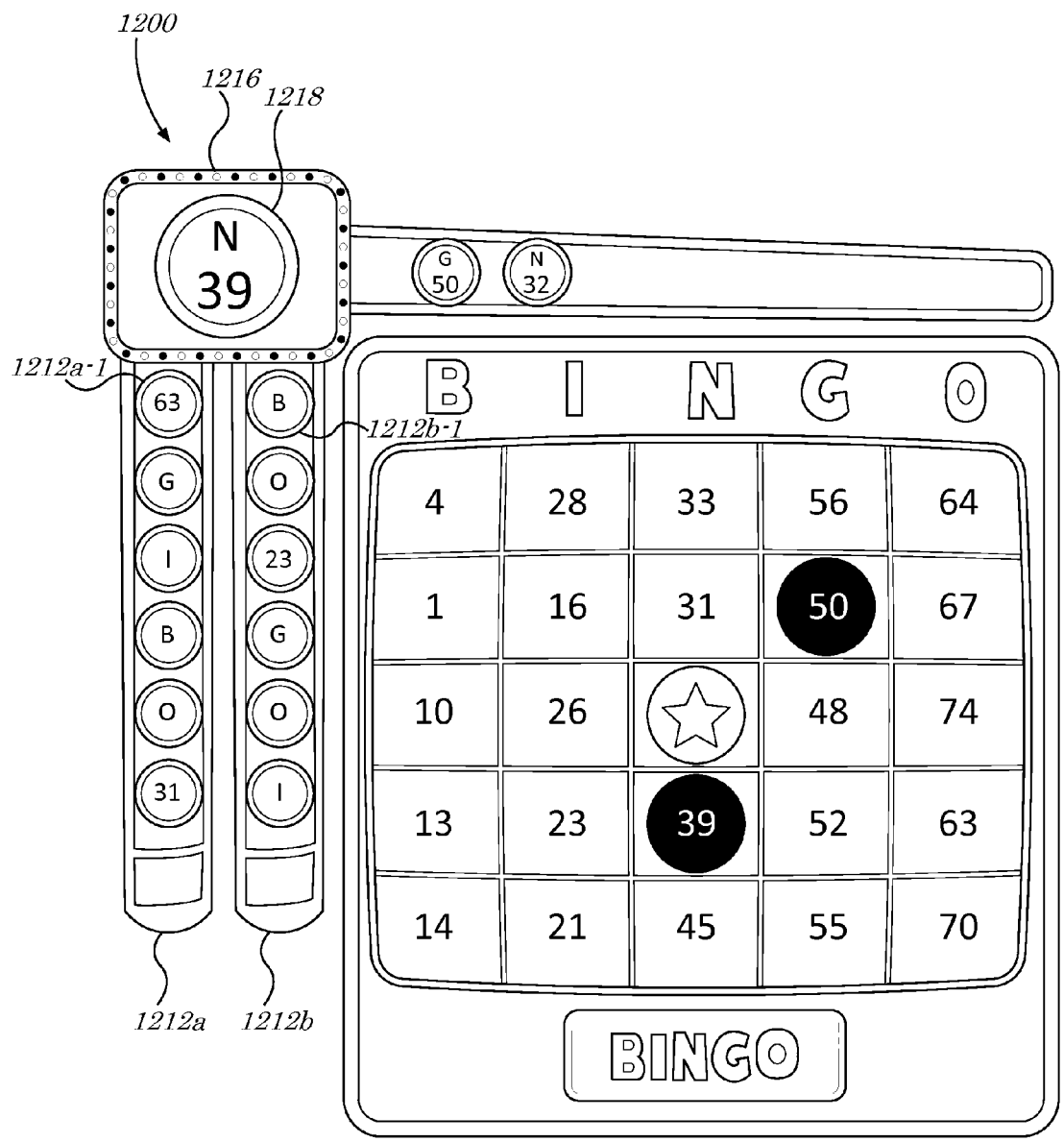
FIG. 12 depicts an example user interface according to one or more embodiments.

FIG. 12 illustrates an example interface 1200 for a game application providing for play of a bingo game in accordance with one or more embodiments. The example interface 1200, as depicted, includes a bingo card area (similar to that depicted in example interface 1100 of FIG. 11A), a ball call area 1216 and a representation of a called ball 1218. The example interface 1200 also includes a plurality of ball queues 1212a, 1212b. In accordance with some embodiments, a bingo game may involve the use of more than one visible ball queue. In one example, bingo balls drawn for a bingo game (e.g., a predetermined sequence of ball draws) may be represented as allocated between two or more visible queues. The allocation may be predetermined (e.g., prior to play of the bingo game) or determined at random during play of the bingo game. In some embodiments, the order in which balls will be called and the respective ball queue in which each drawn ball will be represented (before being enabled for play) may be determined, stored in a database and/or transmitted to a computing device for use in configuring the interface. As depicted in example interface 1200, a player may see that bingo ball 1212a-1 is next up from ball queue 1212a and bingo ball 1212b-1 is next up from ball queue 1212b, but the player may not know which of the two balls will be called next. In some embodiments, the order in which balls are called from the visible queues may be determined in accordance with a random selection process.

F. Additional Embodiments

According to some embodiments, a game may distinguish visually or otherwise indicate to a player (e.g., via a user interface) that one or more bingo symbols (e.g., bingo balls) represented in a queue may be relevant to a player, may complete one or more winning bingo patterns, may contribute to completing one or more bingo patterns, and/or may be present on a player's bingo card. In one embodiment, if a bingo ball displayed in a visible ball queue would complete a winning bingo pattern (if the queued bingo ball is enabled for play), the bingo ball may be represented in a manner that distinguishes it visually from other bingo balls in the queue. Accordingly, the manner in which the bingo ball is represented in the queue may indicate to the player that the number of the bingo ball may complete a winning bingo pattern. In some embodiments, a bingo ball may be visually distinguished in the manner discussed above only in the case that the number associated with the bingo ball is also indicated in the queue; alternatively, or in addition, the relevance of a bingo ball to a player's bingo card may indicated visually if the number is not also indicated (e.g., where only the corresponding column identifier is indicated).

According to some embodiments, distinguishing the bingo ball visually may comprise one or more of: highlighting, embellishing, or otherwise emphasizing the representation of the bingo ball; and/or representing the bingo ball using one or more colors, fonts, styles, shapes, etc., different from other bingo balls in the queue.

While some embodiments described in this disclosure may make advantageous use of the visible ball queue by including one or more special balls (e.g., a ball having one or more functions or features associated with it), special balls are not required to be used with a visible ball queue, and no individual special ball is required to validate the advantages of the visible ball queue functionality.

According to some embodiments, players may be able to interact with a displayed ball queue on an individual and/or communal or group level. According to one embodiment, one or more players may indicate one or more balls (e.g., in a visible queue) that the respective player would like to be a special ball (e.g., to become associated with one or more special functions).

In some embodiments, a player may be able to indicate (e.g., in a voting or other selection process via a user interface) one or more balls in a visible queue the player wants to advance in the queue (e.g., to the front of the queue). In some embodiments, a bingo system may take the collective results of a plurality of players (e.g., the votes of a community or team) and subsequently modify the sequence of balls in the ball queue based on the collective results. In one embodiment, players may vote (e.g., via a user interface) for which ball to advance in a visible queue displaying two or more upcoming ball calls. The order of balls in a queue (e.g., displayed in a visible queue) may be determined (e.g., re-ordered by a controller of the bingo system) based on how many players voted for each of the balls, with the ball receiving the most votes moving to the front of the queue, the ball receiving the second most amount of votes moving to the second spot in the queue, and so on.

According to some embodiments, a player may indicate (e.g., via a user interface) one or more balls in a visible queue to which the player would like a win multiplier applied (e.g., if the player wins with the associated number, the player will win a multiplier on the resulting payout). In some embodiments, a bingo system may use the respective selections of a plurality of players (e.g., the votes of a community or team) to determine at least one ball with which to associate a win multiplier based on the selections of the plurality of players. In one embodiment, a controller of a bingo system may apply a win multiplier to one or more balls (e.g., by updating the displayed indication of a ball in a queue to represent the associated multiplier; by updating an associated record in a database) based on the respective selections of one or more players.

In some embodiments, one or more plays of a bingo game may be purchased (e.g., by a player) from, or otherwise made available (e.g., to players), via a central controller or bingo system. In one embodiment, game plays are available for purchase from an online service provider such as a web-based retailer and/or social networking service (e.g. via a software application associated with a social networking web site).

According to some embodiments, information associated with one or more bingo games (including, for example, indications of payout amount(s), result(s), associated players or purchasers, may be transmitted to, received by and stored by a player device (e.g., a computer, a cell phone, etc.).

According to some embodiments, special balls that may appear in a bingo game may include one or more of the following:
  a. "Wild Ball": when the associated number is daubed, at least one adjacent number is also marked
  b. "Crazy Ball": when the associated number is daubed, at least one other number is daubed (e.g., a random number; a number that appears to the player to have been randomly selected)
  c. "Key Ball": when the associated number is daubed, the player also receives at least one key or other game symbol
  d. "Bad Luck Ball" or un-marker ball: un-daubs at least one number associated with it (e.g., a number previously daubed)
  e. "Bonus Ball" or bonus round ball: unlocks at least one bonus round for the player
  f. Payout multiplier ball: player wins a payout multiplier when calling a win on the special ball
  g. Pattern marking balls: one or more additional numbers are marked around the specified number associated with the special ball, in a predefined or random pattern (e.g., all the numbers in a row or column)
  h. Multi-call special ball: daubs all (or a plurality of) numbers having a particular characteristic
    i. Numbers that have the number X in them (e.g., marks all numbers having a "5" in them, such as 5, 15, 52, etc.)
    ii. Odd numbers (e.g., all odd numbers)
    iii. Even numbers
    iv. Numbers greater than an associated number X
    v. Numbers less than an associated number Y
  i. Trigger advance ball: advances a feature (e.g., bonus round) closer to triggering for a community and/or individual
  j. Prize increment ball: increments one or more associated prize values
  k. Award ball: awards one or more of one or more types of game elements (e.g., collectibles, keys, achievements and/or statuses), such as for a wider or secondary game (e.g., in which a prize is awarded for collecting a predetermined number of symbols)
  l. Play mode ball: special balls may activate one or more modes of play for a player and/or a group of players:
    i. Turbo calling (e.g., increasing speed at which balls are called)
    ii. Auto daubing (e.g., when balls are called, corresponding numbers are automatically daubed)
    iii. Multi calls (e.g., a plurality of calls are made at the same time)

According to some embodiments, one or more functions associated with a special ball may be triggered after, or in response to, one or more of:
  a. A player marking an associated number (or the associated number being auto-daubed);
  b. A player wins on a bingo card having a number or other symbol associated with the special ball (e.g., by marking a winning pattern);
  c. A player does not have the associated number on his bingo card; or
  d. A player has an associated number on his bingo card but fails to daub.

INTERPRETATION

Numerous embodiments are described in this patent application, and are presented for illustrative purposes only. The described embodiments are not, and are not intended to be, limiting. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention that must be present in all embodiments. It is contemplated, however, that while some embodiment are not limited by the examples provided herein, some embodiments may be specifically bounded or limited by provided examples, structures, method steps, and/or sequences. Embodiments having scopes limited by provided examples may also specifically exclude features not explicitly described or contemplated.

Neither the Title (set forth at the beginning of the first page of this patent application) nor the Abstract (set forth at the end of this patent application) is to be taken as limiting in any way the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise. Similarly, any reference to an "alternate", "alternative", and/or "alternate embodiment" is intended to connote one or more possible variations—not mutual exclusivity. In other words, it is expressly contemplated that "alternatives" described herein may be utilized and/or implemented together, unless they inherently are incapable of being utilized together.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including the specification, its claims and figures, and anything which may be incorporated by reference, unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on". In some embodiments, a first thing being "based on" a second thing refers specifically to the first thing taking into account the second thing in an explicit manner. In such embodiments, for example, a processing step based on the local weather, which itself is in some manner based on or affected by (for example) human activity in the rainforests, is not "based on" such human activities because it is not those activities that being explicitly analyzed, included, taken into account, and/or processed.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "wherein", as utilized herein, does not evidence intended use. The term "wherein" expressly refers to one or more features inclusive in a particular embodiment and does not imply or include an optional or conditional limitation.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to allow for distinguishing that particular referenced feature from another feature that is described by the same term or by a similar term. For example, a "first widget" may be so named merely to allow for distinguishing it in one or more claims from a "second widget", so as to encompass embodiments in which (1) the "first widget" is or is the same as the "second widget" and (2) the "first widget" is different than or is not identical to the "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; (3) does not indicate that either widget ranks above or below any other, as in importance or quality; and (4) does not indicate that the two referenced widgets are not identical or the same widget. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices which are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this patent application and the title of this patent application are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein. According to some embodiments, a "processor" may primarily comprise and/or be limited to a specific class of processors referred to herein as "processing devices". "Processing devices" are a subset of processors limited to physical devices such as CPU devices, Printed Circuit Board (PCB) devices, transistors, capacitors, logic gates, etc. "Processing devices", for example, explicitly exclude biological, software-only, and/or biological or software-centric physical devices. While processing devices may include some degree of soft logic and/or programming, for example, such devices must include a predominant degree of physical structure in accordance with 35 U.S.C. §101.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:
1. An apparatus for providing online games to a plurality of remote user devices, comprising:

a processor of a game application delivery controller, wherein the game application delivery controller is in communication with a game server cluster;

a computer-readable memory in communication with the processor of the game application delivery controller, the computer-readable memory storing instructions that when executed by the processor of the game application delivery controller direct the processor to:

enable a player to participate in a bingo game using a user device;

receive, from the user device, a request for an online gaming interface for a bingo game;

transmit a call to a bingo game server of the game server cluster for the online gaming interface for the bingo game;

determine a sequence of bingo symbols for the bingo game;

generate the online gaming interface, wherein the generated online gaming interface comprises a representation of an electronic bingo card, a visible ball queue, and a button configured to allow the player to indicate completion of a predetermined winning bingo pattern;

generate, in the visible ball queue of the online gaming interface, a representation of at least one bingo symbol of the determined sequence of bingo symbols that is not yet playable in the bingo game;

enable, in the online gaming interface, a represented first bingo symbol of the determined sequence in the visible ball queue for play in the bingo game;

remove the represented first bingo symbol enabled for play in the bingo game from the visible ball queue in the online gaming interface; and receive, from the online gaming interface, a signal that the player actuated the button to indicate completion of a predetermined winning bingo pattern.

2. The apparatus of claim 1, wherein the sequence comprises a first bingo ball and a second bingo ball to be called after the first bingo ball.

3. The apparatus of claim 1, wherein determining the sequence of bingo symbols for the bingo game comprises:
    determining the sequence of bingo symbols for the bingo game before initiating play of the bingo game by a player.

4. The apparatus of claim 1, wherein the visible ball queue comprises
    a representation of a first bingo ball and a representation of a second bingo ball, wherein neither the first bingo ball nor the second bingo ball is playable in the bingo game.

5. The apparatus of claim 1, wherein the visible ball queue comprises
    a representation of a first bingo ball including an indication of a location identifier associated with the first bingo ball and not including an indication of a bingo number associated with the first bingo ball.

6. The apparatus of claim 1, the computer-readable memory further storing instructions that when executed by the processor direct the processor to:
    advance a represented second bingo symbol in the visible ball queue, wherein the second bingo symbol is not playable in the bingo game.

7. The apparatus of claim 1, wherein enabling the represented first bingo symbol for play in the bingo game comprises:
    calling a bingo symbol displayed in the visible ball queue, thereby making the bingo symbol playable.

8. The apparatus of claim 1, wherein enabling the represented first bingo symbol for play in the bingo game comprises:
    allowing a player to mark, using the online gaming interface, a bingo space corresponding to the represented first bingo symbol.

9. The apparatus of claim 1, the computer-readable memory further storing instructions that when executed by the processor direct the processor to:
    generate a representation of a called bingo number in a ball call area.

10. The apparatus of claim 1, the computer-readable memory further storing instructions that when executed by the processor direct the processor to:
    display, using the online gaming interface, an indication that a represented bingo symbol of the sequence displayed in the visible ball queue would complete a winning bingo pattern when enabled for play, wherein displaying the indication is before enabling the represented bingo symbol for play.

11. A method, comprising:
    receiving, by a game server comprising at least one processor from a game application delivery controller, a request for an online gaming interface for a bingo game;
    determining, by the game server, a sequence of bingo symbols for the bingo game;
    generating, by the game server, the online gaming interface, wherein the generated online gaming interface comprises a representation of an electronic bingo card, a visible ball queue, and a button configured to allow a player to indicate completion of a predetermined winning bingo pattern;
    generating, by the game server in the visible ball queue of the online gaming interface, a representation of at least one bingo symbol of the determined sequence that is not yet playable in the bingo game;
    enabling, by the game server in the online gaming interface, a represented first bingo symbol of the determined sequence in the visible ball queue for play in the bingo game;
    removing the represented first bingo symbol enabled for play in the bingo game from the visible ball queue in the online gaming interface; and
    receiving a signal that the player actuated the button to indicate completion of a predetermined winning bingo pattern.

12. The method of claim 11, wherein determining the sequence of bingo symbols for the bingo game comprises:
    determining the sequence of bingo symbols for the bingo game before initiating play of the bingo game by a player.

13. The method of claim 11, the visible ball queue comprises
    a representation of a first bingo ball and a representation of a second bingo ball, wherein neither the first bingo ball nor the second bingo ball is playable in the bingo game.

14. The method of claim 11, the visible ball queue comprises
    a representation of a first bingo ball including an indication of a location identifier associated with the first bingo ball and not including an indication of a bingo number associated with the first bingo ball.

15. The method of claim 11, further comprising:
    advancing a represented second bingo symbol in the visible ball queue, wherein the second bingo symbol is not playable in the bingo game.

16. The method of claim 11, wherein enabling the represented first bingo symbol for play in the bingo game comprises:
- calling the represented first bingo symbol displayed in the visible ball queue, thereby making the bingo symbol playable.

17. The method of claim 11, wherein enabling the represented first bingo symbol for play in the bingo game comprises:
- allowing a player to mark, using the online gaming interface, a bingo space corresponding to the represented first bingo symbol.

18. The method of claim 11, further comprising:
- generating a representation of a called bingo number in a ball call area.

19. The method of claim 11, wherein the sequence comprises a first bingo ball and a second bingo ball to be called after the first bingo ball.

20. The method of claim 11, further comprising:
- displaying, using the online gaming interface, an indication that a represented bingo symbol of the sequence displayed in the visible ball queue would complete a winning bingo pattern when enabled for play, wherein displaying the indication is before enabling the represented bingo symbol for play.

* * * * *